US011405698B2

(12) United States Patent
Yamagishi et al.

(10) Patent No.: US 11,405,698 B2
(45) Date of Patent: Aug. 2, 2022

(54) INFORMATION PROCESSING APPARATUS, INFORMATION PROCESSING METHOD, AND PROGRAM FOR PRESENTING REPRODUCED VIDEO INCLUDING SERVICE OBJECT AND ADDING ADDITIONAL IMAGE INDICATING THE SERVICE OBJECT

(71) Applicant: SATURN LICENSING LLC, New York, NY (US)

(72) Inventors: Yasuaki Yamagishi, Kanagawa (JP); Yuka Kiyama, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 44 days.

(21) Appl. No.: 16/975,924

(22) PCT Filed: Mar. 18, 2019

(86) PCT No.: PCT/JP2019/011131
§ 371 (c)(1),
(2) Date: Aug. 26, 2020

(87) PCT Pub. No.: WO2019/188485
PCT Pub. Date: Oct. 3, 2019

(65) Prior Publication Data

US 2020/0413155 A1 Dec. 31, 2020

(30) Foreign Application Priority Data

Mar. 26, 2018 (JP) ............................ JP2018-059026

(51) Int. Cl.
*H04N 21/84* (2011.01)
*G06F 16/783* (2019.01)
(Continued)

(52) U.S. Cl.
CPC ......... *H04N 21/84* (2013.01); *G06F 16/7834* (2019.01); *G06F 16/7837* (2019.01);
(Continued)

(58) Field of Classification Search
None
See application file for complete search history.

(56) References Cited

U.S. PATENT DOCUMENTS 8,161,172 B2 4/2012 Reisman
2007/0022437 A1 * 1/2007 Gerken ................ H04N 21/235 725/41
(Continued)

FOREIGN PATENT DOCUMENTS

JP 2002-369180 A 12/2002
JP 2011-108147 A 6/2011
(Continued)

OTHER PUBLICATIONS

International Search Report dated May 28, 2019 in PCT/JP2019/011131 filed Mar. 18, 2019, 1 page.

*Primary Examiner* — James R Marandi
(74) *Attorney, Agent, or Firm* — Jeffery J Brosemer

(57) ABSTRACT

This information processing apparatus includes: a media reproduction unit that acquires and reproduces video data including a service object, for which a service that processes a request from a user through voice is available; and a controller that adds an additional image for informing the user about the service object to the reproduced video and saves identification information of the video data and information of a start time and an end time of the additional image, as a bookmark that is optionally selected by the user and is provided to a scene with the additional image.

16 Claims, 29 Drawing Sheets

(51) Int. Cl.

| | |
|---|---|
| ***H04N 21/422*** | (2011.01) |
| ***H04N 21/81*** | (2011.01) |
| ***H04N 21/845*** | (2011.01) |

(52) U.S. Cl.

CPC ... *H04N 21/42203* (2013.01); *H04N 21/8133* (2013.01); *H04N 21/8456* (2013.01)

(56) References Cited

U.S. PATENT DOCUMENTS

| | | | | |
|---|---|---|---|---|
| 2011/0126105 | A1 | 5/2011 | Isozu | |
| 2012/0072307 | A1* | 3/2012 | Kassaei | G06Q 30/0613 705/26.41 |
| 2012/0167145 | A1* | 6/2012 | Incorvia | H04N 21/8583 725/60 |
| 2013/0282527 | A1* | 10/2013 | Mannik | G06F 16/9562 705/26.61 |
| 2014/0250479 | A1 | 9/2014 | Lee et al. | |
| 2014/0372569 | A1* | 12/2014 | Bouazizi | H04L 65/602 709/219 |
| 2015/0382079 | A1 | 12/2015 | Lister et al. | |
| 2017/0068423 | A1 | 3/2017 | Napolitano et al. | |

FOREIGN PATENT DOCUMENTS

| | | | |
|---|---|---|---|
| JP | 2015-22310 | A | 2/2015 |
| WO | WO 2016/203726 | A1 | 12/2016 |

* cited by examiner

POI (Point of Interest) metadata

- POI icon image
- POI presentation color
- POI presentation position
- POI presentation text
- POI filtering information
  - Identification name of user demographic class
  - User identification information

```
Content-Type: Multipart/related; boundary="boundary-part"; type=application/mbms-envelope+xml
--boundary-part
Content-Type: application/mbms-envelope+xml; charset=utf-8
<?xml version="1.0" encoding="utf-8"?>
<metadataEnvelope
xmlns="urn:3gpp:metadata:2005:MBMS:envelope"
xmlns:xs="http://www.w3.org/2001/XMLSchema">
    <item metadataURI=" http://a.com/poi.xml" version="1" contentType=" application/poi+xml"/>
    <item metadataURI=" http://a.com/poiHandler.html" version="1" contentType="text/html"/>
</metadataEnvelope>
--boundary-part
Content-Type: application/poi+xml; charset=utf-8
Content-Location:http://a.com/poi.1.xml
```

POI metadata file — 61

```
--boundary-part
Content-Type: text/html; charset=utf-8
Content-Location: http://a.com/poiHandler.html
```

Web application file
(html page and its sub-resource) — 62

```
--boundary-part
```

FIG.13

```
<rights>
 <agreement>
  <party>
   <context>
    <uid>http://a.com/accountManagerOfProgramA</uid>
    <name> charging management url of broadcast station of program A </name>
   </context>
   <rightsholder/>
  </party>
  <asset>
   <context>
    <uid>http://a.com/program A.poi1.xml</uid>
    <name>POI-1 of program A </name>
   </context>
  </asset>
  <party>
   <context>
    <uid>urn:anyUserWhoPayedIt</uid>
    <name> User who paid charge amount below   </name>
   </context>
  </party>
  <permission>
   <play>
    <requirement>
     <prepay>
      <amout currency=USD>1.00</amount>
     </prepay>
    </requirement>
   </play>
  </permission>
 </agreement>
</rights>
```

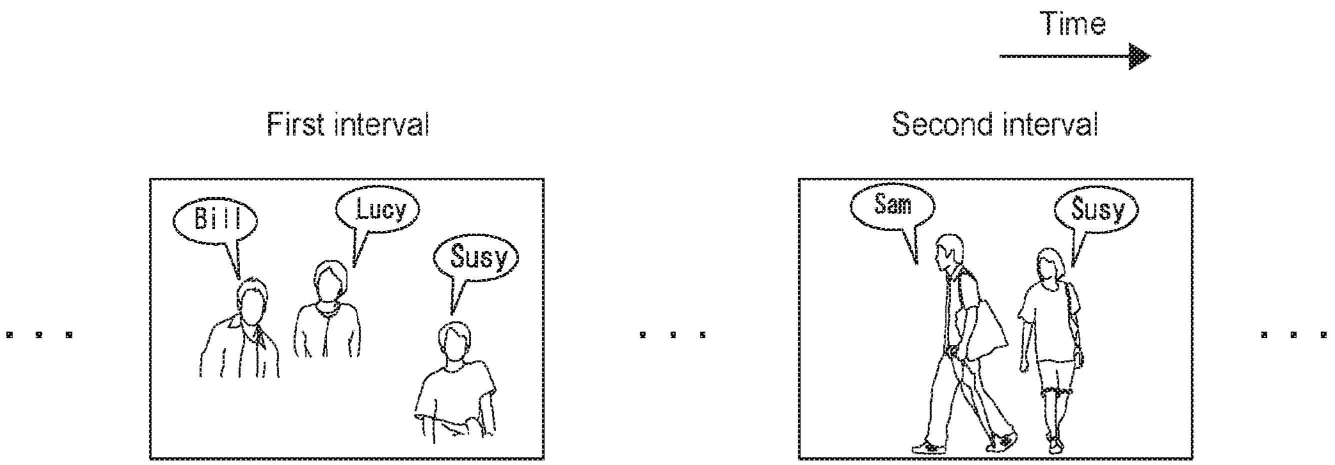

```
POI(1)
  ...
  /POIBackEndControl (Function A)
    @ContextSwitch(http://.../Function A?Context-1)
POI(2)
  ...
  /POIBackEndControl (Function A)
    @ContextSwitch(http://.../Function A?Context-1)
POI(3)
  ...
  /POIBackEndControl (Function A)
    @ContextSwitch(http://.../Function A?Context-1)
```

```
POI(1)
  ...
  /POIBackEndControl (Function A)
    @ContextSwitch(http://.../Function A?Context-2)
POI(2)
  ...
  /POIBackEndControl (Function A)
    @ContextSwitch(http://.../Function A?Context-2)
POI(3)
  ...
  /POIBackEndControl (Function A)
    @ContextSwitch(http://.../Function A?Context-2)
```

FIG.28

```
<rights>
 <agreement>
  <party>
   <context>
    <uid>urn:anyUserWhoDownloadThePOIMeta</uid>
    <name> User who downloaded this POI metadata   </name>
   </context>
  </party>
 <permission>
  <share
  <constraint>
   <group>
    <context>
     <uid>SNS.member </uid>
    </context>
   </group>
  </constraint>
 </permission>
 <asset>
  <context>
   <uid>http://a.com/Program A.poi1.xml</uid>
   <name>-POI 1 of Program A</name>
  </context>
 </asset>
 </agreement>
<rights>
```

FIG.29

INFORMATION PROCESSING APPARATUS, INFORMATION PROCESSING METHOD, AND PROGRAM FOR PRESENTING REPRODUCED VIDEO INCLUDING SERVICE OBJECT AND ADDING ADDITIONAL IMAGE INDICATING THE SERVICE OBJECT

TECHNICAL FIELD

The present technology relates to an information processing apparatus, an information processing apparatus, and a program that perform information processing for receiving and reproducing moving image content including videos, and particularly, to an information processing apparatus, an information processing method, and a program that are suitable for, for example, a case where the moving image content works with a voice-based information service for a user of the information processing apparatus.

BACKGROUND ART

Voice artificial intelligence (AI) assistant services have been recently prevailing. Those services are information services in which a terminal supporting the services picks up a request through voice made by a user of an information processing apparatus by using a microphone or the like, recognizes the request, analyzes data, executes a service corresponding to the request of the user, and responds to the user for a result of the execution through sound or the like (see, for example, Patent Literature 1). Alexa (registered trademark) of Amazon Echo (registered trademark) is currently known as a voice AI assistant service based on cloud.

CITATION LIST

Patent Literature

Patent Literature 1: Japanese Patent Application Laid-open No. 2015-022310

DISCLOSURE OF INVENTION

Technical Problem

The inventors of the present technology have examined a mechanism in which the voice AI assistant service as described above is used as means for collecting information regarding people or products appearing in a video in an environment where moving image content including the video is reproduced. For example, in a case where a user as a viewer wants to know then and there various things such as a role of a person appearing in the moving image content, a relationship with other people appearing therein, and further the profile of the actor who acts that person, the user can receive information from the voice AI assistant service in real time.

However, if the voice AI assistant service is actually used as means for collecting information regarding people or products appearing in a video in an environment where moving image content including the video is reproduced, a suitable way of using the voice AI assistant service while making use of the properties of the voice AI assistant service has not yet established sufficiently, and problems to be solved are stacked.

In this regard, the present technology has an object to provide an information processing apparatus, an information processing apparatus, and a program, which are capable of using a voice AI assistant service while making use of the properties thereof when a reproduced video is viewed.

Solution to Problem

In order to solve the problems described above, an information processing apparatus according to the present technology includes: a media reproduction unit that acquires and reproduces video data including a service object, for which a service that processes a request from a user through voice is available; and a controller that adds an additional image for informing the user about the service object to the reproduced video and saves identification information of the video data and information of a start time and an end time of the additional image, as a bookmark that is optionally selected by the user and is provided to a scene with the additional image.

The controller may receive a selection of the optional bookmark from the user and reproduce the video data with the additional image on the basis of the identification information of the video data and the information of the start time and the end time of the additional image, which correspond to the selected bookmark.

The controller may acquire metadata including the identification information of the video data and the information of the start time and the end time of the additional image to generate the additional information, and add the additional information on the basis of the acquired metadata.

The metadata may include service back-end control information including a function name that indicates a function of the service identified by utterance from the user, and the controller may present the function name of the service back-end control information to the user, the service back-end control information being included in the metadata corresponding to the bookmark selected by the user.

The metadata may include information for requesting a different function for each time zone by using one function name, and the controller may transmit the request to a server that switches the function of the service on the basis of the information.

The controller may be configured to restrict use of the service for each service object.

The restriction may be a restriction by charging or a restriction regarding whether sharing of the metadata of the additional image on a community service is possible or not.

The additional image may include a visual feature unique to each service object such that the service object is uniquely determined by voice recognition in the service. Alternatively, the additional image may be presented at a position attached to the service object.

Furthermore, the controller may acquire an MPD file including AdaptationSet of the metadata, analyze the MPD file, acquire each of the video data and the metadata as a Media Segment of MPEG-DASH, and present the video data and the additional image based on the metadata in synchronization with each other.

An information processing method of another embodiment according to the present technology includes the procedure of: acquiring and reproducing video data including a service object, for which a service that processes a request from a user through voice is available; and adding an additional image for informing the user about the service object to the reproduced video and saving identification information of the video data and information of a start time and an end time of the additional image, as a bookmark that is optionally selected by the user and is provided to a scene with the additional image.

A program of still another embodiment according to the present technology causes a computer to function as: a media reproduction unit that acquires and reproduces video data including a service object, for which a service that processes a request from a user through voice is available; and a controller that adds an additional image for informing the user about the service object to the reproduced video and saves identification information of the video data and information of a start time and an end time of the additional image, as a bookmark that is optionally selected by the user and is provided to a scene with the additional image.

Advantageous Effects of Invention

As described above, according to the present technology, it is possible to use a voice AI assistant service while making use of the properties thereof when a reproduced video is viewed.

BRIEF DESCRIPTION OF DRAWINGS

FIG. 13 is a diagram showing an example of a Multi-part MIME format packaging a web application and the POI metadata.

FIG. 23 is a diagram showing a description example of POI use restriction information by an ODRL.

FIG. 28 is a diagram showing change in value of ContextID attributes in the POI metadata, which are respectively linked with scenes of two time zones to which different voice AI assistant service programs are assigned.

FIG. 29 is a diagram showing a description example of sharing propriety control information by the ODRL.

MODE(S) FOR CARRYING OUT THE INVENTION

Figure 1:
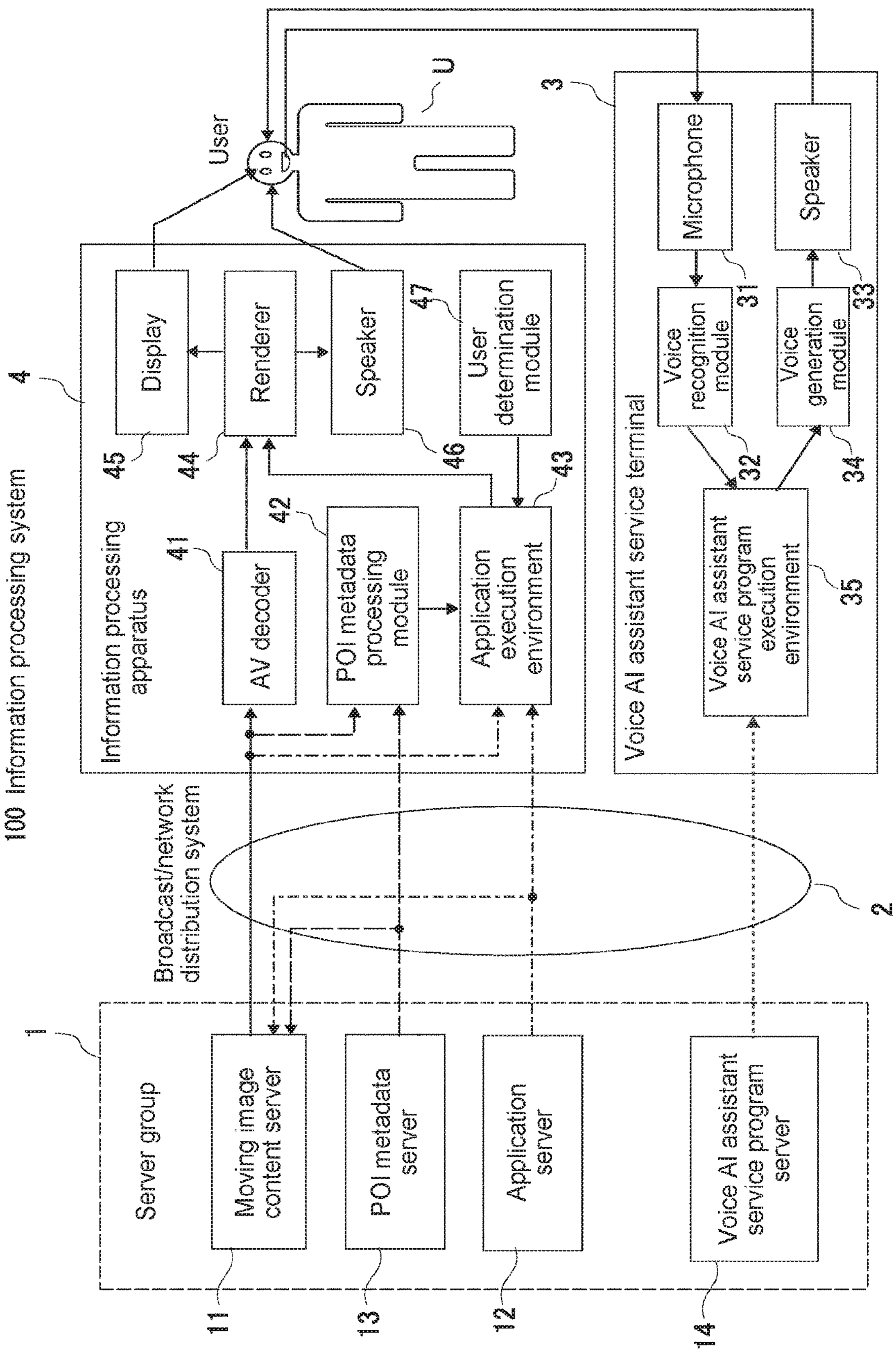
FIG. 1 is a block diagram showing an overall configuration of an information processing system 100 including an information processing apparatus 4 of a first embodiment according to the present technology.

Hereinafter, an embodiment according to the present technology will be described.

<Summary of Information Processing Apparatus of Embodiment>

An information processing apparatus 4 of this embodiment includes: an AV decoder 41 that acquires and reproduces video data including a service object, for which a service that processes a request from a user through voice is available; an application execution environment 43 that adds an additional image for informing the user about the service object to the reproduced video and saves identification information of the video data and information of a start time and an end time of the additional image, as a bookmark that is optionally selected by the user and is provided to a scene with the additional image; a bookmark browser 51; and a bookmark database 50.

This allows the user to register a bookmark for a scene with an optional additional image in an interval of moving image content being viewed, in which a voice assistant service is usable, and to reproduce the scene with the additional image at an optional later timing on the basis of the bookmark selected by the user.

(Overall Configuration of System)

FIG. 1 is a block diagram showing an overall configuration of an information processing system 100 including an information processing apparatus 4 of a first embodiment according to the present technology. Note that FIG. 1 shows a configuration of a part that generates an additional image to be synthesized with video data in the information processing system 100 including the information processing apparatus 4 of this embodiment.

As shown in the figure, the information processing system 100 includes a server group 1, a broadcast/network distribution system 2, a voice AI assistant service terminal 3, and an information processing apparatus 4 of a user.

(Regarding Server Group 1)

The server group 1 includes a moving image content server 11, an application server 12, a POI metadata server 13, and a voice AI assistant service program server 14.

The moving image content server 11 accumulates data of moving image content such as commercial messages (CMs) and programs. The data of moving image content may be multimedia data configured by a plurality of kinds of media data such as video, audio, and subtitles. The present technology is applicable particularly to video data, and it does not matter whether other media data such as audio and subtitles is present or not.

The POI metadata server 13 directly distributes POI metadata corresponding to the moving image content to the information processing apparatus 4 via the broadcast/network distribution system 2. Alternatively, in a case where at least the data of the moving image content and the POI metadata are gathered in a predetermined data structure in the moving image content server 11 and then distributed to the information processing apparatus 4, the POI metadata server 13 supplies the POI metadata to the moving image content server 11 via the broadcast/network distribution system 2. The POI metadata will be described later.

The application server 12 directly distributes an application for executing processing based on the POI metadata in the information processing apparatus 4, to the information processing apparatus 4 via the broadcast/network distribution system 2. Alternatively, in a case where the data of the moving image content, the POI metadata, and the application are gathered in a predetermined data structure in the moving image content server 11 and then distributed to the information processing apparatus 4, the application server 12 supplies the application to the moving image content server 11 via the broadcast/network distribution system 2.

The voice AI assistant service program server 14 supplies a voice AI assistant service program to the voice AI assistant service terminal 3 via the broadcast/network distribution system 2. The voice AI assistant service program is a program configured to generate a service execution result in response to a service request, which is provided by a user U who is a viewer of the moving image content, for a service object such as a specific person or product appearing in the moving image content.

The broadcast/network distribution system 2 is a system to distribute the data of the moving image content, the data structure in which the data of the moving image content and the POI metadata are gathered, or the data structure in which the data of the moving image content, the POI metadata, and the application are gathered, to the information processing apparatus 4 via broadcasting or network communication. Additionally, the broadcast/network distribution system 2 is also used for data transfer between the moving image content server 11, the application server 12, and the POI metadata server 13, and further data transfer between the voice AI assistant service program server 14 and the voice AI assistant service terminal 3.

(Regarding Information Processing Apparatus 4)

The information processing apparatus 4 includes, as hardware elements, a central processing unit (CPU), a main memory such as a random access memory (RAM), storage devices such as a hard disk drive (HDD) and a solid state drive (SSD), a user interface, a broadcast reception unit such as an antenna and a broadcast tuner, and a communication interface such as a network interface. The information processing apparatus 4 may be specifically information terminals wearable by the user, such as a personal computer, a smartphone, a tablet terminal, a television, a game device, and a head mounted display (HMD).

The information processing apparatus 4 includes, as functional elements achieved by the hardware elements described above and software elements, an AV stream acquisition unit 41, a POI metadata processing module 42, an application execution environment 43, and a renderer 44.

The information processing apparatus 4 includes, as user interfaces, a display 45 and a speaker 46. Furthermore, the information processing apparatus 4 may include a user determination module 47 as a functional element.

The AV stream acquisition unit 41 acquires multimedia data (video data, audio data, and the like) of the moving image content from the moving image content server 11 via the broadcast/network distribution system 2 and decodes the multimedia data.

The POI metadata processing module 42 supplies the POI metadata, which is acquired from the moving image content server 11 or the POI metadata server 13 via the broadcast/network distribution system 2, to the application execution environment 43.

The "POI metadata" is metadata for adding an added image to a video being reproduced in the information processing apparatus 4, the added image informing the user U of the information processing apparatus 4 about a specific service object, to which a voice AI assistant service is assigned in that video. The POI is an abbreviation for Point of Interest. The "specific service object" means a person or product appearing in the video, for which the voice AI assistant service can respond to a service request from the user U.

The application execution environment 43 is an environment where a native application or a web application is executed using the CPU and the main memory. The application execution environment 43 generates an added image, which is to be added to the service object in the video, on the basis of the POI metadata provided by the POI metadata processing module 42. The "added image" is generated, for example, as a "speech balloon", such that a relationship with the service object in the video is easily understandable, for example. However, the present technology is not limited to the above, and any image with which a relationship with the service object in the video is easily understandable may be used.

The renderer 44 generates a display signal, which is to be output to the display 45, from video data decoded by the AV stream acquisition unit 41, and outputs audio data decoded by the AV stream acquisition unit 41 to the speaker 46. Additionally, in a case where an added image is supplied from the application execution environment 43, the renderer 44 synthesizes that added image on the video of the program.

The display 45 presents the video to the user U. The speaker 46 presents the audio to the user U.

(Regarding Voice AI Assistant Service Terminal 3)

The voice AI assistant service terminal 3 is a terminal that provides a voice assistant service to the user U of the information processing apparatus 4. More specifically, the voice AI assistant service terminal 3 is an apparatus capable of receiving a service request, which is provided by the user U through voice, for an optional service object in the video, executing that service, and returning an execution result of the service to the user U by using sound or the like. Here, the service request from the user U through voice is provided using, for example, words in the form of question, and an execution result of the service is returned to the user U by, for example, synthesized voice in the form of response or the like.

The voice AI assistant service terminal 3 includes a microphone for assistant service 31, a voice recognition module 32, a speaker for voice AI assistant service 33, a voice generation module 34, and a voice AI assistant service program execution environment 35.

The microphone for assistant service 31 captures the service request provided through voice from the user U of the information processing apparatus 4.

The voice recognition module 32 recognizes the voice of the service request captured by the microphone for assistant service 31 and passes request data to the voice AI assistant service program execution environment 35.

The voice AI assistant service program execution environment 35 is an environment where the voice AI assistant service program acquired from the voice AI assistant service program server 14 is executed. The voice AI assistant service program execution environment 35 generates data of an execution result of the service for the request data, which is supplied from the voice recognition module 32, and supplies the data to the voice generation module 34.

The voice generation module 34 converts the data of the execution result of the service, which is supplied from the voice AI assistant service program execution environment 35, into synthesized voice.

The speaker for assistant service 33 presents the synthesized voice, which is supplied from the voice generation module 34, to the user U of the information processing apparatus 4.

(Overall Operation Flow (Part 1) of Information Processing System)

Figure 2:
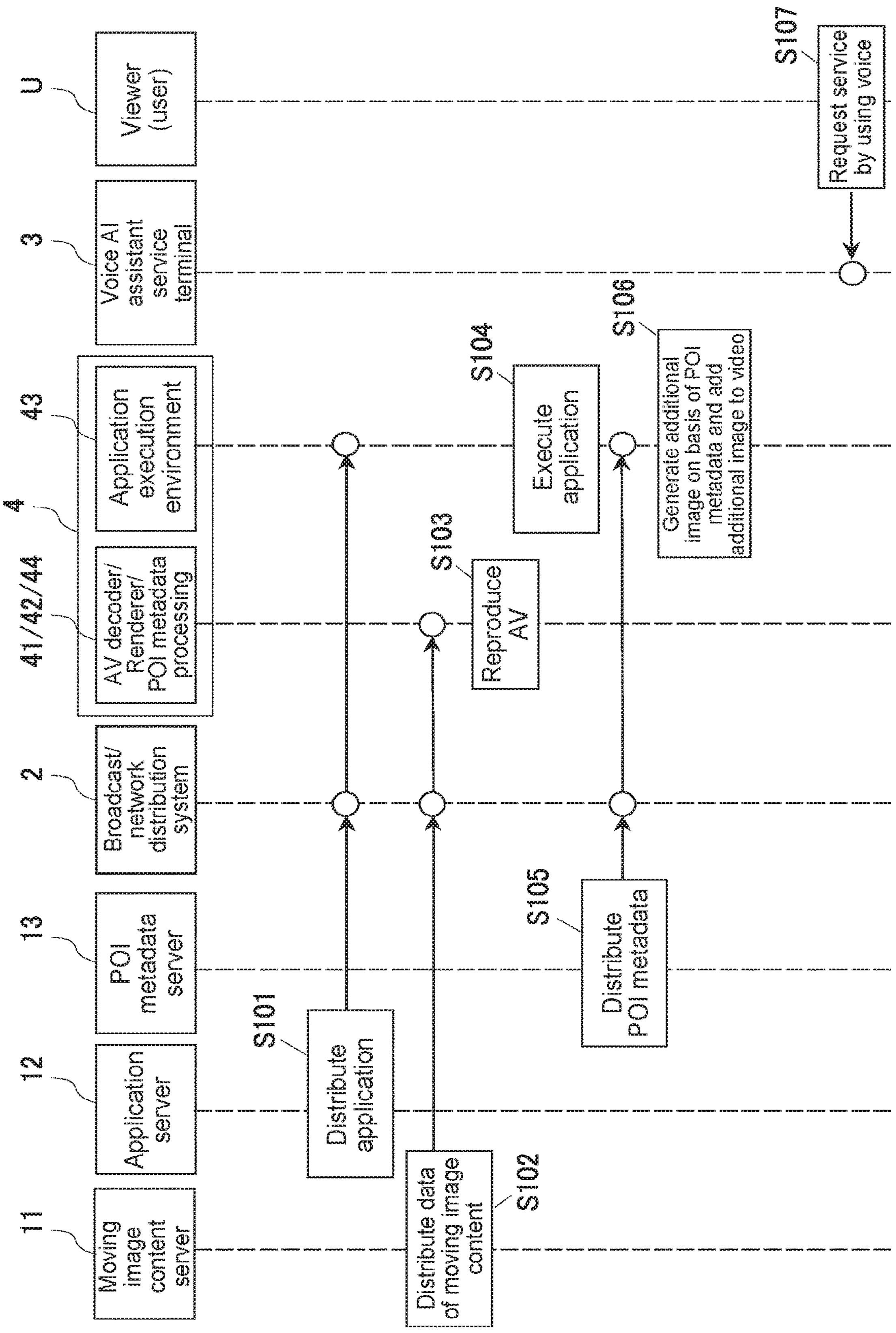
FIG. 2 is a sequence diagram showing an overall operation flow (part 1) of the information processing system 100 of FIG. 1.

FIG. 2 is a sequence diagram showing the overall operation flow (part 1) of the information processing system 100 in this embodiment.

It is assumed that the data of the moving image content, the application, and the POI metadata are respectively distributed from different servers (moving image content server 11, application server 12, and POI metadata server 13).

First, the application is distributed from the application server 12 to the information processing apparatus 4 via the broadcast/network distribution system 2 (Step S101). Furthermore, the data of the moving image content is distributed from the moving image content server 11 to the information processing apparatus 4 via the broadcast/network distribution system 2 (Step S102). In the information processing apparatus 4, the received data of the moving image content is decoded in the AV stream acquisition unit 41, and the resultant video data and audio data are respectively supplied to the display 45 and the speaker 46 via the renderer 44 (Step S103).

Additionally, the application distributed from the application server 12 to the information processing apparatus 4 is installed in the application execution environment 43, and the application is executed (Step S104).

Next, the POI metadata corresponding to the moving image content is distributed from the POI metadata server 13 to the information processing apparatus 4 via the broadcast/network distribution system 2 (Step S105). In the information processing apparatus 4, the POI metadata is supplied to the application execution environment 43 by the POI metadata processing module 42. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S106).

The user U then provides a service request, through voice, for the service object for which the additional image is presented in the video displayed on the display 45, to the voice AI assistant service terminal 3, and uses the voice AI assistant service (Step S107).

(Overall Operation Flow (Part 2) of Information Processing System)

Figure 3:
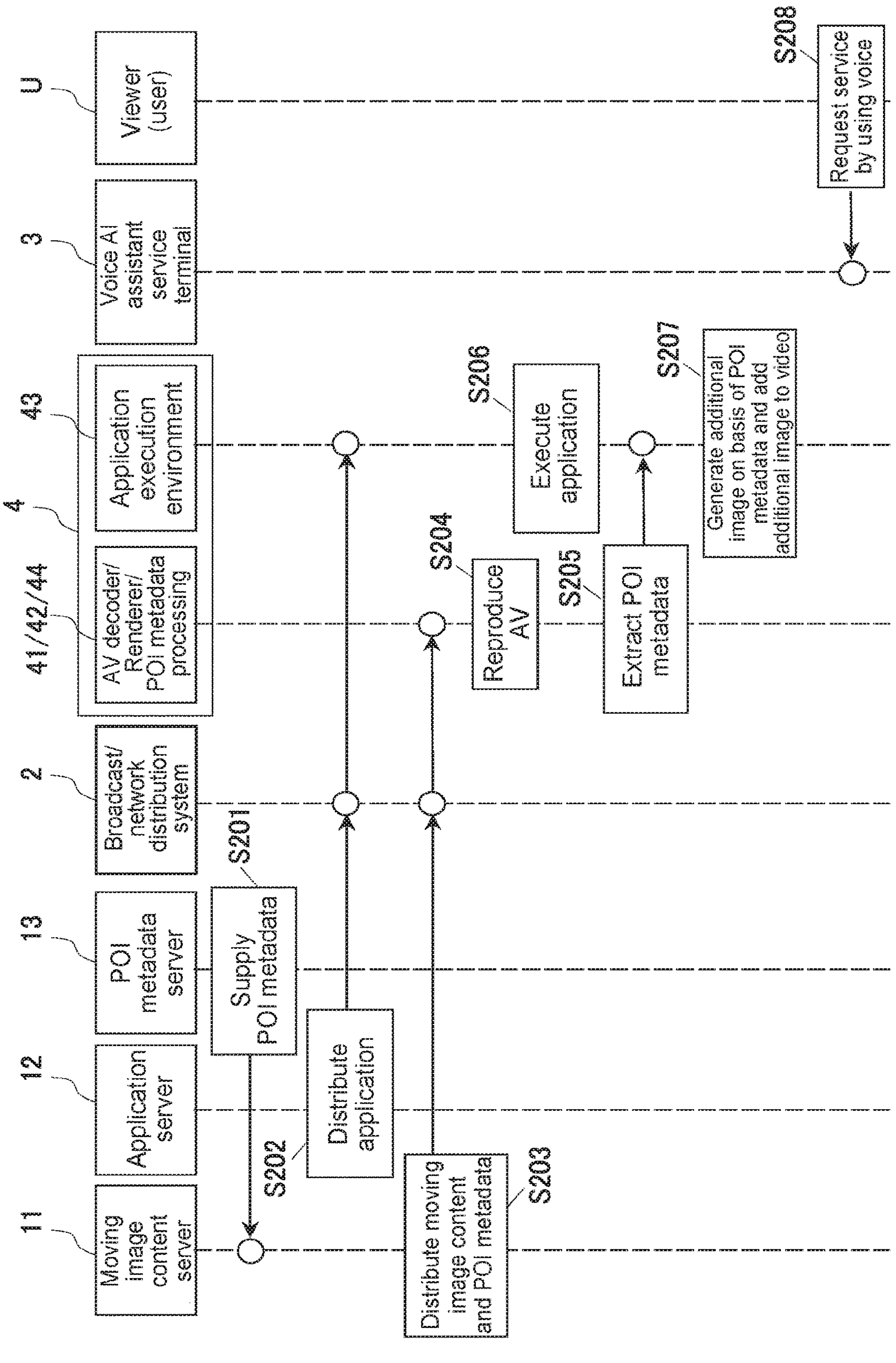
FIG. 3 is a sequence diagram showing an overall operation flow (part 2) of the information processing system 100 of FIG. 1.

FIG. 3 is a sequence diagram showing the overall operation flow (part 2) of information processing system 100 in this embodiment.

In the operation flow (part 1) described above, the data of the moving image content and the POI metadata are distributed from the different servers (moving image content server 11 and POI metadata server 13) to the information processing apparatus 4, and thus the synchronization between the data of the moving image content and the POI metadata is not ensured in the information processing apparatus 4.

In this regard, in the operation flow (part 2) shown in FIG. 3, first, the POI metadata is supplied from the POI metadata server 13 to the moving image content server 11 via the broadcast/network distribution system 2 (Step S201), and an application is distributed from the application server 12 to the information processing apparatus 4 via the broadcast/network distribution system 2 (Step S202). Subsequently, the POI metadata and the data of the moving image content are gathered in a predetermined data structure in the moving image content server 11 and are distributed to the information processing apparatus 4 via the broadcast/network distribution system 2 (Step S203).

In the information processing apparatus 4, the data of the moving image content is extracted from the data structure received in the AV stream acquisition unit 41, the extracted data of the moving image content is decoded in a decoder within the AV stream acquisition unit 41, and the resultant video data and audio data are respectively supplied to the display 45 and the speaker 46 via the renderer 44 (Step S204).

Additionally, in the information processing apparatus 4, the POI metadata is extracted from the received data structure by the POI metadata processing module 42 (Step S205) and is supplied to the application execution environment 43. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S207).

The user U then provides a service request, through voice, for the service object for which the additional image is presented in the video displayed on the display 45, to the voice AI assistant service terminal 3, and uses the voice AI assistant service (Step S208).

In such a manner, the POI metadata and the data of the moving image content are gathered in a predetermined data structure and distributed from the moving image content server 11 to the information processing apparatus 4, which ensures that the data of the moving image content and the POI metadata can be processed in synchronization with each other in the information processing apparatus 4. This allows a correct additional image to be constantly added to the service object in the video of the program and allows a stable voice AI assistant service to be maintained.

Note that, in the operation flow (part 2), the application is distributed from the application server 12 to the information processing apparatus 4 via the broadcast/network distribution system 2 (Step S202), installed in the application execution environment 43, and executed (Step S206), which is the same as the operation flow (part 1) described above.

(Overall Operation Flow (Part 3) of Information Processing System)

Figure 4:
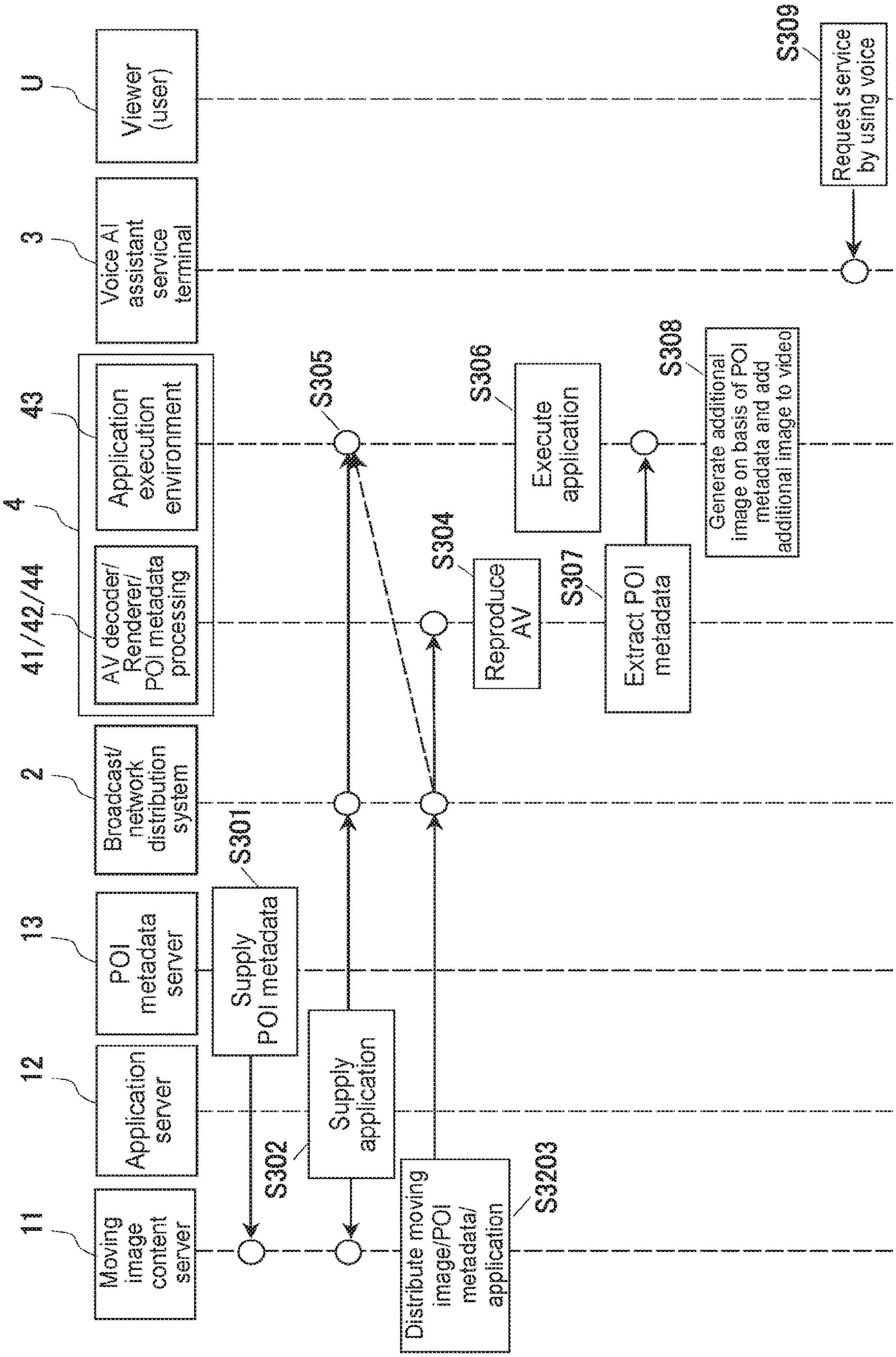
FIG. 4 is a sequence diagram showing an overall operation flow (part 3) of the information processing system 100 of FIG. 1.

FIG. 4 is a sequence diagram showing the overall operation flow (part 3) of the information processing system 100 in this embodiment.

In this operation flow, it is assumed that the data of the moving image content, the POI metadata, and the application that processes them are gathered in a predetermined data structure and distributed from the moving image content server 11 to the information processing apparatus 4.

First, the POI metadata is supplied from the POI metadata server 13 to the moving image content server 11 (Step S301). Furthermore, the application is supplied from the application server 12 to the moving image content server 11 (Step S302). The order of the supply of the POI metadata and the supply of the application may be reversed. Subsequently, the data of the moving image content, the POI metadata, and the application are gathered in a predetermined data structure in the moving image content server 11 and are distributed to the information processing apparatus 4 via the broadcast/network distribution system 2 (Step S303).

In the information processing apparatus 4, the data of the moving image content is extracted from the received data structure, the extracted data of the moving image content is decoded in the AV stream acquisition unit 41, and the resultant video data and audio data are respectively supplied to the display 45 and the speaker 46 via the renderer 44 (Step S304).

Additionally, in the information processing apparatus 4, the application is extracted from the received data structure (Step S305), installed in the application execution environment 43, and executed (Step S306).

Furthermore, in the information processing apparatus 4, the POI metadata is extracted from the received data structure by the POI metadata processing module 42 (Step S307) and is supplied to the application execution environment 43. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S308).

The user U then provides a service request, through voice, for the service object for which the additional image is presented in the video displayed on the display 45, to the voice AI assistant service terminal 3, and uses the voice AI assistant service (Step S309).

(Regarding Additional Image)

Next, the additional image generated on the basis of the POI metadata will be described.

Figures 5, 6:
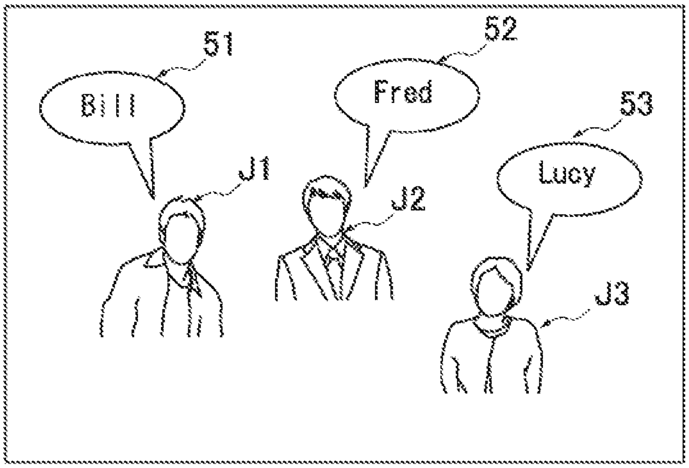
FIG. 5 is a diagram showing an example of a video on which an additional image is superimposed.
FIG. 6 is a block diagram showing a configuration of POI metadata.

FIG. 5 is a diagram showing an example of a video on which the additional image is superimposed.

As shown in the figure, the additional image may be presented as, for example, speech balloons 51, 52, and 53 respectively attached to service objects J1, J2, and J3 for the voice AI assistant service in the video.

Visual features unique to the respective service objects J1, J2, and J3 are provided to the speech balloons 51, 52, and 53 such that, in a case where the user U notifies the voice AI assistant service terminal 3 of the service objects J1, J2, and J3 through voice, the service objects J1, J2, and J3 are uniquely determined by voice recognition in the voice AI assistant service terminal 3. This allows the user U to provide a service request for that service object to the voice AI assistant service terminal 3 by using voice expressing the feature of an optional service object.

For example, in the example of FIG. 5, "Bill", "Fred", and "Lucy", which are character strings of the names of people serving as the service objects J1, J2, and J3, are displayed as visual features in the speech balloons 51, 52, and 53. Thus, the user U can use the name of an optional service object, for example, "What is the latest news of Fred?" or "How old is Bill?", to provide a service request for the service object to the voice AI assistant service terminal 3 through voice. Meanwhile, the voice AI assistant service terminal 3 can identify the service object from the name recognized by the voice recognition module 32 and can execute the voice AI assistant service for the identified service object in accordance with the voice AI assistant service program of the voice AI assistant service program execution environment 35.

Note that the visual features unique to the respective service objects disposed in the speech balloons 51, 52, and 53 may be variously modified with icons, the colors of the speech balloons, the design of the speech balloon, and the like in addition to the character strings of the names of the people appearing in the video.

As described above, in this embodiment, the additional image for informing the user U about the service object is generated for a service object for a voice AI assistant service in the video of the moving image content, and then superimposed on the video of the moving image content to be presented, and thus the user U can uniquely determine the service object from the video and perform a service request for an optional service object. Thus, useless operations of the user U to provide a service request for an object other than the service object to the voice AI assistant service terminal 3 are eliminated, and the voice AI assistant service can be optimally used.

Additionally, the visual features unique to the respective service objects are provided to the additional image such that the service object may be uniquely recognized by the voice recognition in the voice AI assistant service terminal 3, and thus the user U can provide a service request for that service object to the voice AI assistant service terminal 3 by using voice while using voice expressing a feature of an optional service object. Thus, the user U does not hesitate about how the service object is expressed to give a notice to the voice AI assistant service, the service object is reliably identified in the voice AI assistant service terminal 3, and thus an optimal voice AI assistant service is achieved.

Next, the structure of the POI metadata will be described.

(Structure of POI Metadata)

FIG. 6 is a block diagram showing a configuration of the POI metadata.

The POI metadata includes a POI icon image, a POI presentation color, a POI presentation position, a POI presentation text, POI filtering information, POI use restriction information, and voice assistant service back-end control information.

The POI icon image is the substance of an icon file, which is used in a case where an icon is presented on the additional image as a visual feature of the service object unit, or a reference URL (Uniform Resource Locator) to the icon file. An XML (Extensible Markup Language) representation of the POI icon image will be shown below.

<POIIcon iconPng='true'> . . . (base64 encoded png file) . . . </POIIcon>

<POIIcon iconPngURL='true'>http:// . . . (URL of icon png file) . . . </POIIcon>

The POI presentation color is used in a case where a visual feature using color is provided to the additional image. For information of the POI presentation color, for example, a color code of CSS (Cascading Style Sheets) or the like is used. The XML representation of the POI presentation color will be shown below.

<POIColor> . . . (CSS color code) . . . </POIColor>

The POI presentation position includes information such as a URI (Uniform Resource Identifier) of target content, in which the additional image is presented, a URL of a POI presentation application that performs processing of presenting the additional image on the basis of the POI metadata, and a presentation time (start time, end time) of the additional image. The XML representation of the POI presentation position will be shown below.

<POITargetContentID URL='http://a.com/programA.MPD'/>

<POIApplication URL='http://a.com/POI presentation application for program A.html(URL of POI presentation application)'/>

<POITimePosition start='P0Y0M0DT1H15M2.000S (start time)'end='P0Y0M0DT1H15M2.500S(end time)'/>

<POISPosition x='345(x coordinate pixel)'y='567(y coordinate pixel)'/>

The POI presentation text is a character string presented on the additional image in a case where a visual feature using characters is provided to the additional image. The XML representation of the POI presentation text will be shown below.

<POIText> . . . (presentation character strings) . . . </POIText>

The POI filtering information is used in a case where the presentation restriction corresponding to the user or a user attribute of the additional image is performed. The POI filtering information is information for identifying the user U to which the additional image is to be presented, and includes an identification name of a user demographic class and optional user identification information.

The user demographic class means a class, into which the user U is classified on the basis of attributes of the user, such as sex, age, a living region, an occupation, an academic background, and a family structure, and is uniquely identified by the identification name of the user demographic class. The XML representation of the identification name of the user demographic class will be shown below.

<POITargetUser demographicClass='true'> . . . (user demographic class identification name) . . . </POITargetUser>

The optional user identification information is, for example, user identification information such as an account name of a broadcast-station-related service. The XML representation of the optional user identification information will be shown below.

<POITargetUser privateAccount='true'>https:// . . . (URL for identifying user account of service or the like) . . . </POITargetUser>

Note that at least any one of the POI icon image, the POI presentation color, or the POI presentation text only needs to be defined. The POI filtering information is defined in a case where the presentation restriction of additional information to be described later is introduced.

The POI use restriction information is information that defines details of use restriction on provision of information by the voice assistant service for a specific service object. The XML representation of the POI use restriction information will be shown below.

<POIAccessControl rightsExpressionLanguage='ODRL'><<![CDATA[ . . . (access control description represented by ODRL) . . . ] ]> </POIAccessControl>

This is a declaration indicating that the POI use restriction information is a description represented by ODRL. When confirming the declaration of the POI use restriction information, the application execution environment 43 notifies the user of the use restriction on provision of information by the voice assistant service for a specific service object, together with the details of the restriction, on the basis of the POI use restriction information. Note that the details of the POI use restriction information will be described later.

The voice assistant service back-end control information is information that defines a function, for the voice assistant service, which can be used by switching in units of the voice assistant service program. Note that such a function is called "Skill" in Alexa (registered trademark) of Amazon Echo (registered trademark). The XML representation of the voice assistant service back-end control information will be shown below.

<POIBackEndControl ServerSideScriptType='function name' ContextID='(current context switch url used when function context is caused to correspond)'> . . . (current function name) . . . </POIBackEndControl>

(Regarding Presentation Restriction for Additional Images)

Figure 7:
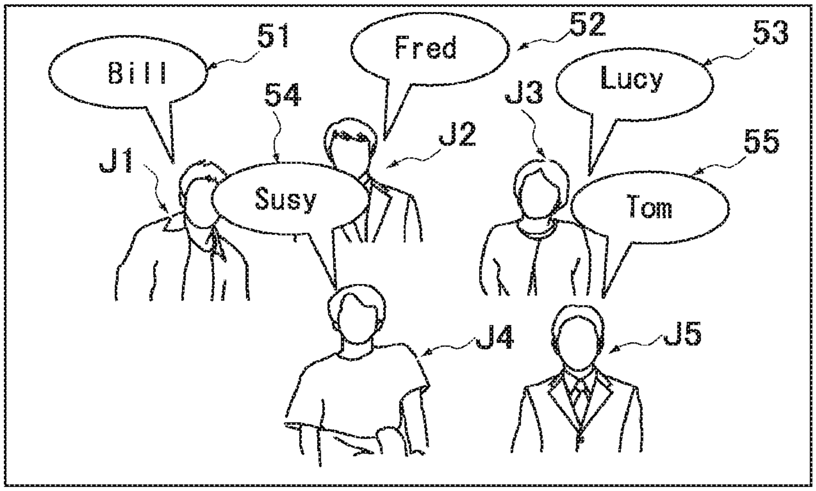
FIG. 7 is a diagram showing another example of a video on which an additional image is superimposed.

In the embodiment described above, the additional image is presented on the service object for the voice AI assistant service, in the video of the moving image content. However, for example, as shown in FIG. 7, in a case where many service objects J1 to J5 are present in one scene, additional images 51 to 55 corresponding to the number of those service objects J1 to J5 are presented. Those additional images 51 to 55 hide part of the video of the program, and visual effects of the video of the program are liable to be deteriorated.

Figure 8:
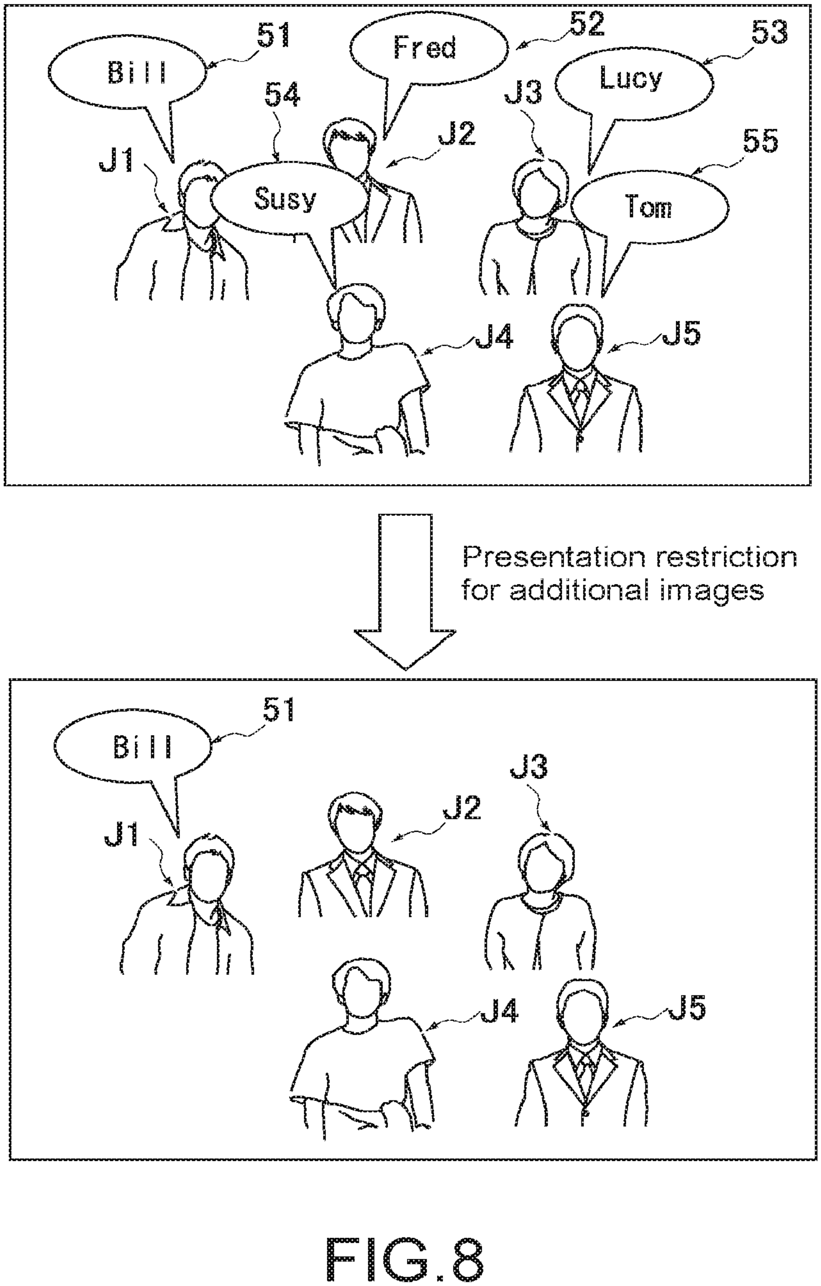
FIG. 8 is a diagram showing presentation restriction for additional images.

In this regard, for example, as shown in FIG. 8, it is effective to restrict the service objects, on which the additional images are presented, according to the user U. For example, the additional image is presented on a service object in which the user U is interested, and no additional images are presented on the other service objects. This can suppress the following situation to a minimum: part of the video of the program is hidden by many additional images and the entire video gets messy by the additional images. This function will be called "presentation restriction for additional images".

Figure 9:
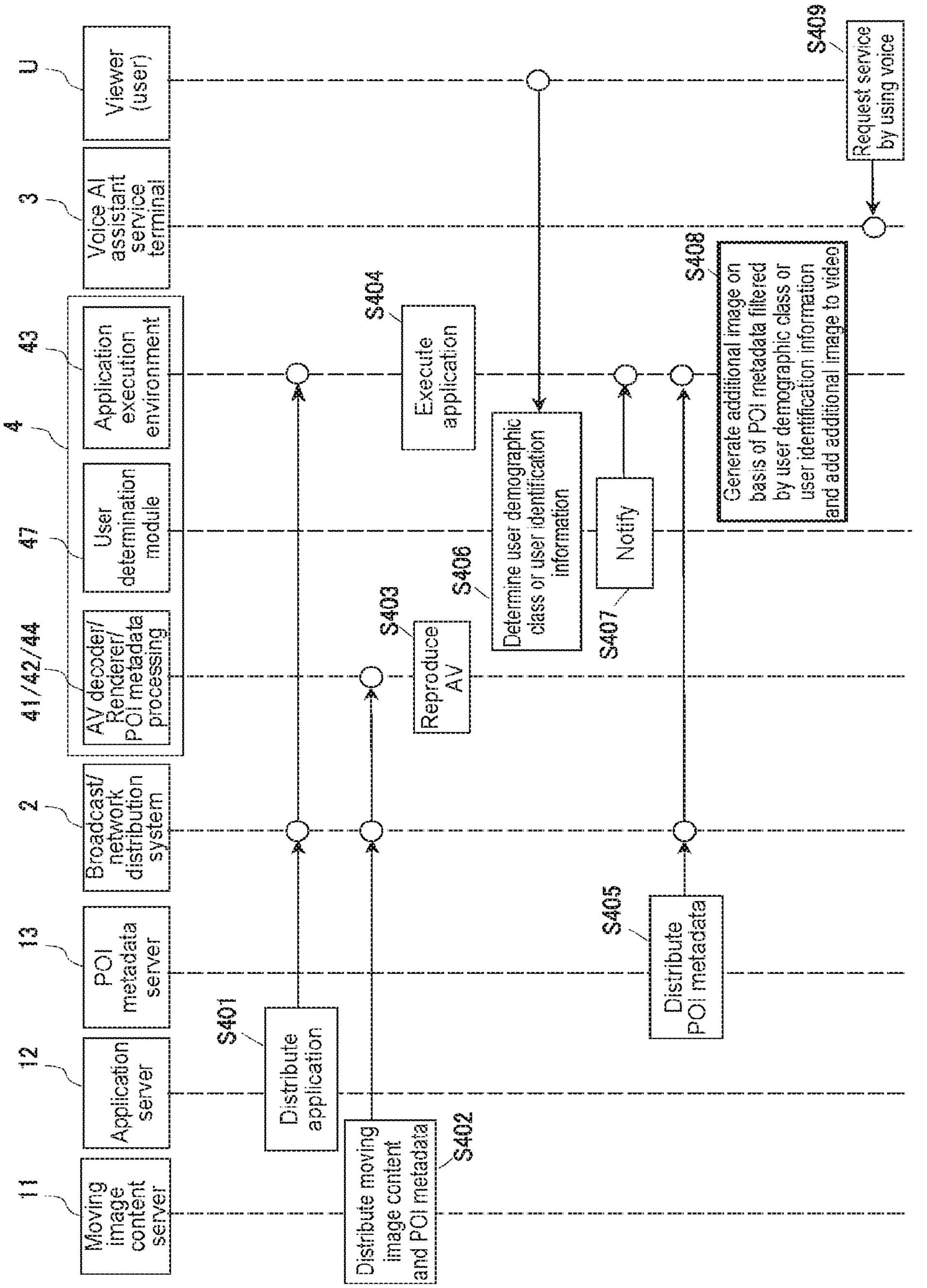
FIG. 9 is a sequence diagram showing an overall operation flow (part 3) including the presentation restriction for additional images in the information processing system 100 of FIG. 1.

FIG. 9 is a sequence diagram showing the operation flow including the presentation restriction for additional images.

Here, the operations of Steps S401 to S405 are the same as those of Steps S101 to S105 in the operation flow (part 1) shown in FIG. 2, and thus description thereof will be omitted.

To perform the presentation restriction for additional images, the user determination module 47 of the information processing apparatus 4 determines a user demographic class or user identification information of the user U (Step S406). The application execution environment 43 is notified of the determined user demographic class or user identification information of the user U (Step S407).

The user demographic class is a class, into which a user is classified on the basis of various attributes of the user, such as sex, age, a living region, an occupation, an academic background, and a family structure. For example, if it can be statistically said that men in their twenties highly tend to be interested in a new actress who has been popular recently, the user demographic class of the men in their twenties is matched with a user demographic class defined in the POI metadata for a person (service object) played by the new actress in the program.

The method of determining the user demographic class or user identification information of the user U by the user determination module 47 includes the following.

1. The user determination module 47 estimates attributes of the user U, such as sex and an age group, from an analysis result of a face image of the user U captured by a camera and determines a user demographic class from the estimated attributes.

2. The user determination module 47 estimates attributes of the user U on the basis of information, which is obtained through a question given from the voice AI assistant service terminal 3 to the user U through sound, and determines a user demographic class.

3. In a case where a plurality of users who uses the information processing apparatus 4 is restricted, the identification name of a user demographic class or the user identification information is registered in advance in association with the user name of each user, and thus the user determination module 47 can determine the identification name of a user demographic class or the user identification information corresponding to the user name, which is confirmed through authentications such as a biometric authentication and a card authentication.

Next, the application execution environment 43 of the information processing apparatus 4 extracts POI metadata in which the identification name of the user demographic class or the user identification information, which is determined by the user determination module 47, is defined as the POI filtering information, from all of the POI metadata of respective scenes of the video of the moving image content, generates an additional image, which informs the user U about a service object in the video, on the basis of the extracted POI metadata, and supplies the additional image to the renderer 44. Thus, a synthesized image in which the additional image is superimposed on the video of the program is obtained and displayed on the display 45 (Step S408).

The user U then provides a service request, through voice, for the service object for which the additional image is presented in the video displayed on the display 45, to the voice AI assistant service terminal 3, and uses the voice AI assistant service (Step S409).

Note that the presentation restriction for additional images has been described here assuming the overall operation flow (part 1) of the information processing system shown in FIG. 2, but the same holds true for the overall operation flow (part 2) and the overall operation flow (part 3).

Next, referring back to FIG. 8, description will be continued. Here, it is assumed that the identification name of the user demographic class of the service object J1 in the video is "class 1", the identification names of the user demographic classes of the other service objects J2 to J5 are other than "class 1". Meanwhile, it is assumed that the user determination module 47 determines the user demographic class of the user U as "class 1". In this case, the additional image 51 is presented for the service object J1 only, and thus it is possible to suppress the following situation to a minimum: part of the video of the program is hidden by the additional images 52 to 55 added to the service objects J2 to J5, in which the user U is not interested, and the entire video gets messy.

Note that in a case where the presentation restriction for additional images is performed with the user identification information as a filtering condition, an additional image for a specific service object can be presented to a specific user U only.

(Setting of User Demographic Class Based on Viewing History of User U)

Note that, in the above description, the user demographic class of the user U is determined from attributes such as sex, age, a living region, an occupation, an academic background, and family attributes, but the user determination module 47 may calculate a preference condition of the user U on the basis of the viewing history of the user U and determine the user demographic class on the basis of the preference condition or considering the preference condition.

(Trick Play Reproduction Based on POI Metadata)

Next, a trick play reproduction based on the POI metadata will be described.

The trick play reproduction based on the POI metadata is to reproduce at a first double-speed a scene in which the additional image is presented on the basis of the POI metadata extracted on the basis of the user demographic class or user identification information of the user U, and to reproduce the other scenes at a second double-speed faster than the first double-speed.

Here, the first double-speed is, for example, a 1× speed (equal speed) or a speed slower than the 1× speed. The second double-speed is, for example, for a fast-forward reproduction faster than the 1× speed.

Next, the operation of the trick play reproduction based on the POI metadata will be more specifically described.

First, the user determination module 47 determines the user demographic class or user identification information of the user U and supplies it to the application execution environment 43.

The application execution environment 43 selects, from all the POI metadata of the respective scenes of the video of the program, POI metadata in which the identification name of the user demographic class or the user identification information, which is determined by the user determination module 47, is defined as the POI filtering information, and the application execution environment 43 performs the trick play reproduction on the basis of the extracted POI metadata.

Figure 10:
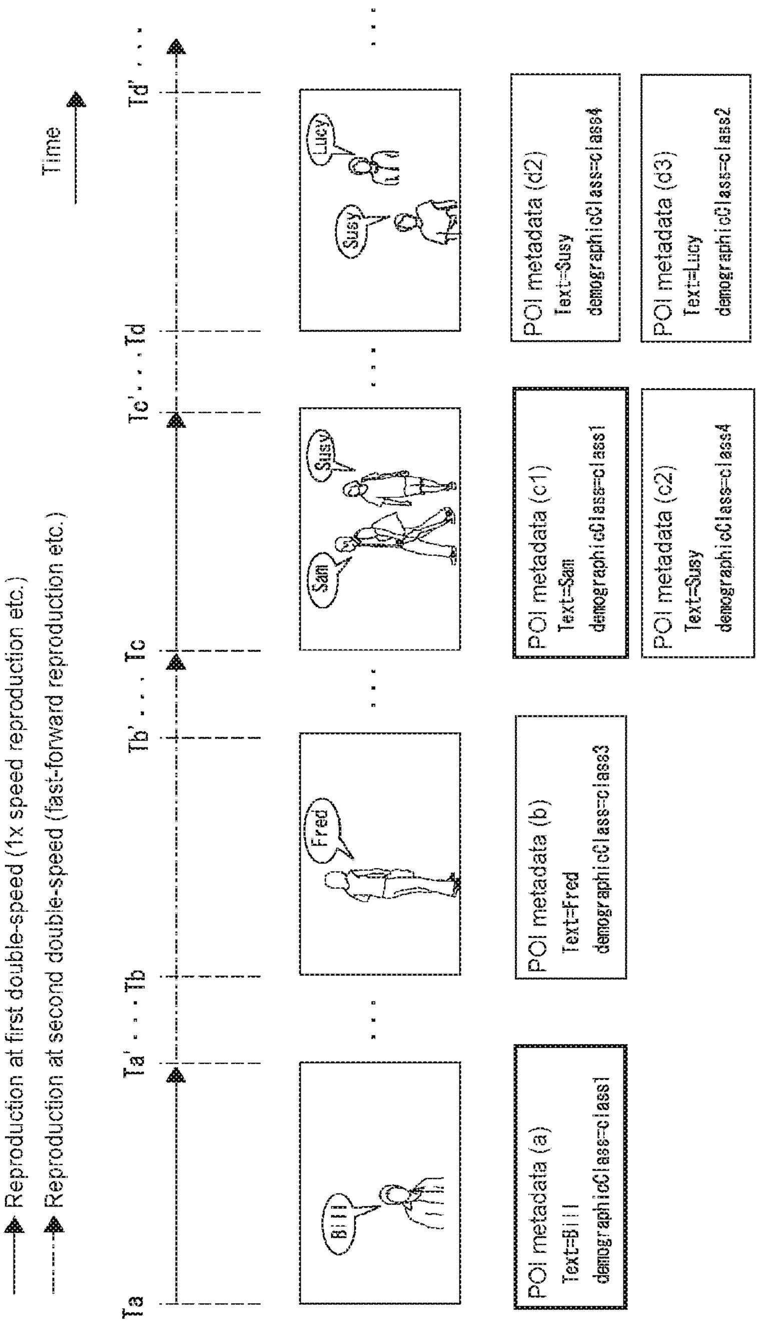
FIG. 10 is a diagram for describing trick play reproduction based on the POI metadata.

FIG. 10 is a diagram specifically showing the trick play reproduction based on the POI metadata.

Here, it is assumed that the user demographic class of "Bill" and "Sam" that are service objects is "class 1", and the user demographic class of the user U, which is determined by the user determination module 47, is "class 1".

"Bill" having the user demographic class of "class 1" appears in the video during a Ta-Ta' period, and thus the application execution environment 43 reproduces the video including an additional image at the first double-speed during the Ta-Ta' period. Subsequently, no service objects having the user demographic class of "class 1" appear in the video until time Tc, and thus the application execution environment 43 performs reproduction at the second double-speed faster than the first double-speed. Note that the additional image is not presented in the reproduction at the second double-speed, and thus the load on the application execution environment 43 can be reduced. "Sam" having the user demographic class of "class 1" appears in the video during a Tc-Tc' period, and thus the application execution environment 43 reproduces the video including an additional image at the first double-speed during the Tc-Tc' period. No service objects having the user demographic class of "class 1" appear in the video after the time Tc', and thus the reproduction at the second double-speed is performed.

In such a manner, a scene in which the additional image is presented on the basis of the POI metadata extracted on the basis of the user demographic class or user identification information of the user U is reproduced at the first double-speed, and the other scenes are reproduced at the second double-speed faster than the first double-speed, thus achieving the trick play reproduction focusing on the scene that is useful (interesting) for the user U.

Additionally, a skip reproduction may be performed on only the scene in which the additional image is presented on the basis of the POI metadata extracted on the basis of the user demographic class or user identification information of the user U.

The functions of the presentation of additional images, the presentation restriction for additional images, the trick play reproduction, and the like on the basis of the POI metadata by the information processing system according to this embodiment have been described so far.

(Regarding Application Execution Environment 43)

Figure 11:
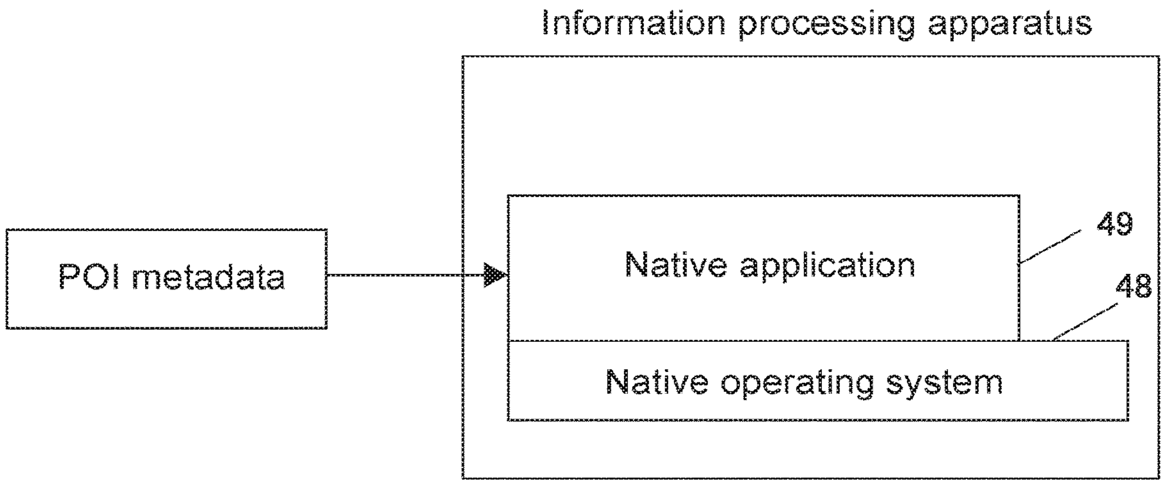
FIG. 11 is a diagram showing an example of an application execution environment 43 in which the POI metadata is processed.

FIG. 11 is a diagram showing an example of the application execution environment 43 in which the POI metadata is processed.

This example shows a case where an application that processes the POI metadata is a native application 49 that operates on a native operating system 48 of the information processing apparatus 4.

Figure 12:
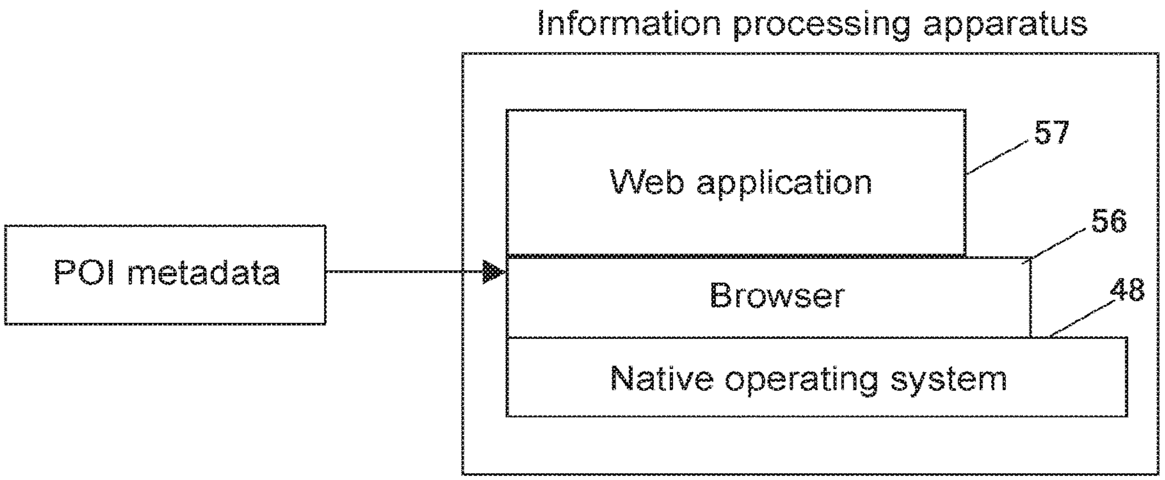
FIG. 12 is a diagram showing another example of the application execution environment 43 in which the POI metadata is processed.

FIG. 12 is a diagram showing another example of the application execution environment 43 in which the POI metadata is processed.

This example shows a case where an application that processes the POI metadata is a web application 57 that operations on a web browser 56. In this case, the POI metadata and the web application 57 are simultaneously or substantially simultaneously distributed to the information processing apparatus 4.

(POI Metadata Transfer Method)

To simultaneously distribute the web application and the POI metadata to the information processing apparatus 4, a method of packaging the web application and the POI metadata by using a Multi-part MIME (Multipurpose Internet MAIl Extensions) format is employed. FIG. 13 is a diagram showing an example of the Multi-part MIME format packaging the web application and the POI metadata. In the Multi-part MIME format, a POI metadata file 61 and a web application file 62 are individually stored in respective parts separated by boundary-parts.

Note that, in a case where an application that processes the POI metadata is a native application that operates with the operation system being as an application execution environment, or the application is distributed separately from the POI metadata, only the POI metadata file may be stored in the Multi-part MIME format and then distributed.

Next, a method of storing a track of the POI metadata in an MP4 file format and transferring the MP4 file format, in a similar manner to the track of media data such as video data and audio data, will be described.

Figure 14:
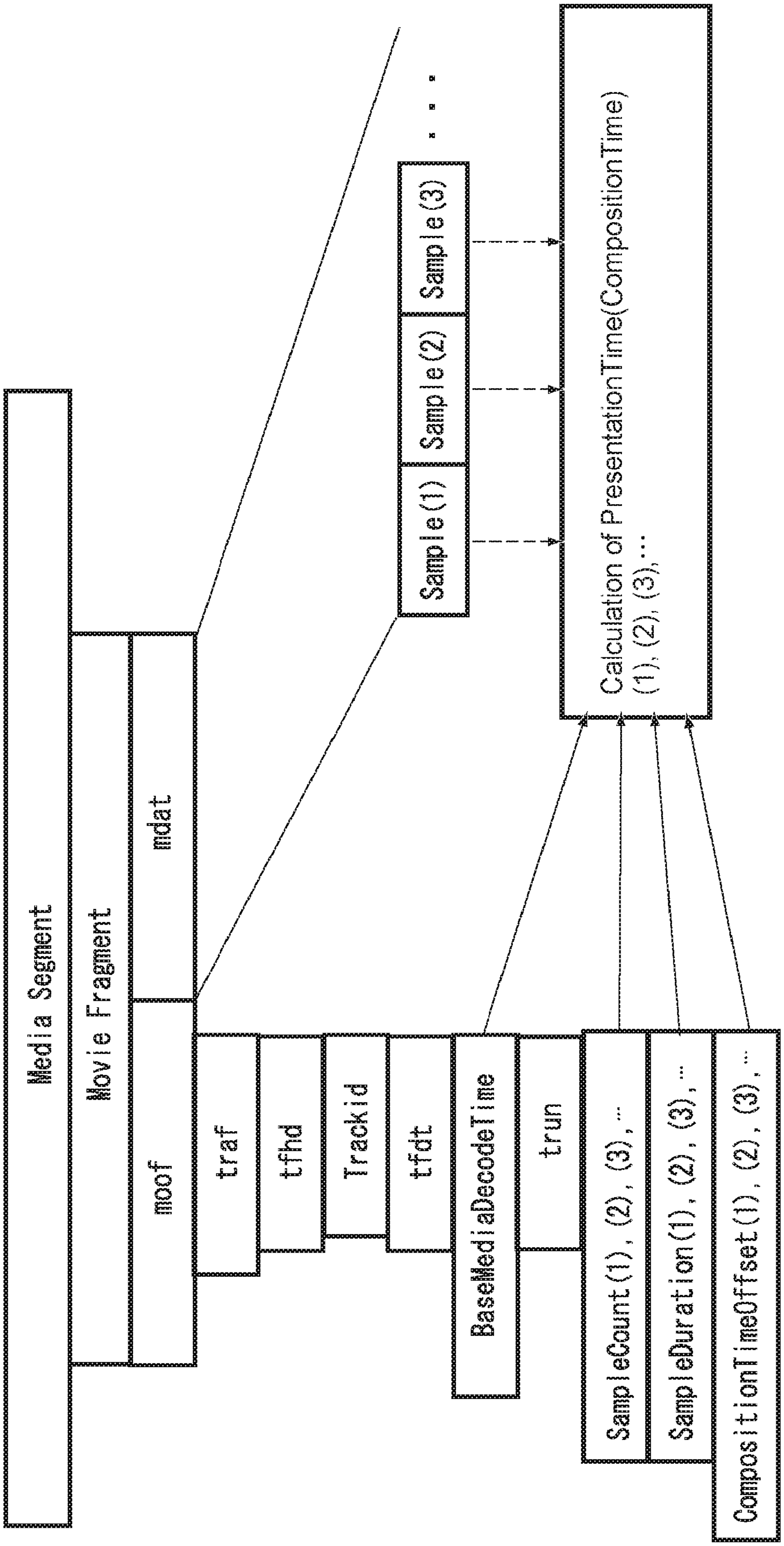
FIG. 14 is a diagram showing a configuration of Media Segment in an MP4 file format.

FIG. 14 is a diagram showing a configuration of a Media Segment in the MP4 file format.

As shown in the figure, the Media Segment includes a plurality of Movie Fragents, and each Movie Fragent is configured by an moof box and an mdat box. In the mdat box, for example, media data is divided into a plurality of Sample boxes by a time unit such as a frame and stored to be randomly accessible. In the moof box, metadata regarding presentation, such as information for generating a timing to present the media data of each Sample box of the mdat box, is stored.

In this embodiment, a Media Segment in which video data is stored in each Sample box of the mdat box, a Media Segment in which audio data is stored in each Sample box of the mdat box, a Media Segment in which the POI metadata is stored in each Sample box of the mdat box are prepared.

Note that, in this embodiment, the MP4 file is assumed as a Media Segment of an MPEG-DASH (Dynamic Adaptive Streaming over HTTP).

(Regarding MPEG-DASH)

In the MPEG-DASH, a plurality of data groups having different coding rates and screen sizes is prepared for one piece of moving image content so as to prevent the streaming reproduction from being interrupted. The plurality of data groups is dynamically selected in consideration of the screen size of the information processing apparatus 4, a state of a network bandwidth, or the like. Thus, in the MPEG-DASH, as described above, what coding rates and screen sizes of the data groups are prepared for one piece of moving image content is described in metadata referred to as MPD (Media Presentation Description).

Next, the data structure of the MPD will be described in detail.

The MPD is information regarding the configuration of the moving image content stored in a server, which is described in the hierarchical structure of the XML (extensible markup language) format. The information processing apparatus 4 acquires an MPD file corresponding to target moving image content from an MPD file server and analyzes the MPD file, and thus acquires a Media Segment necessary for presenting the target moving image content from the server.

Figure 15:
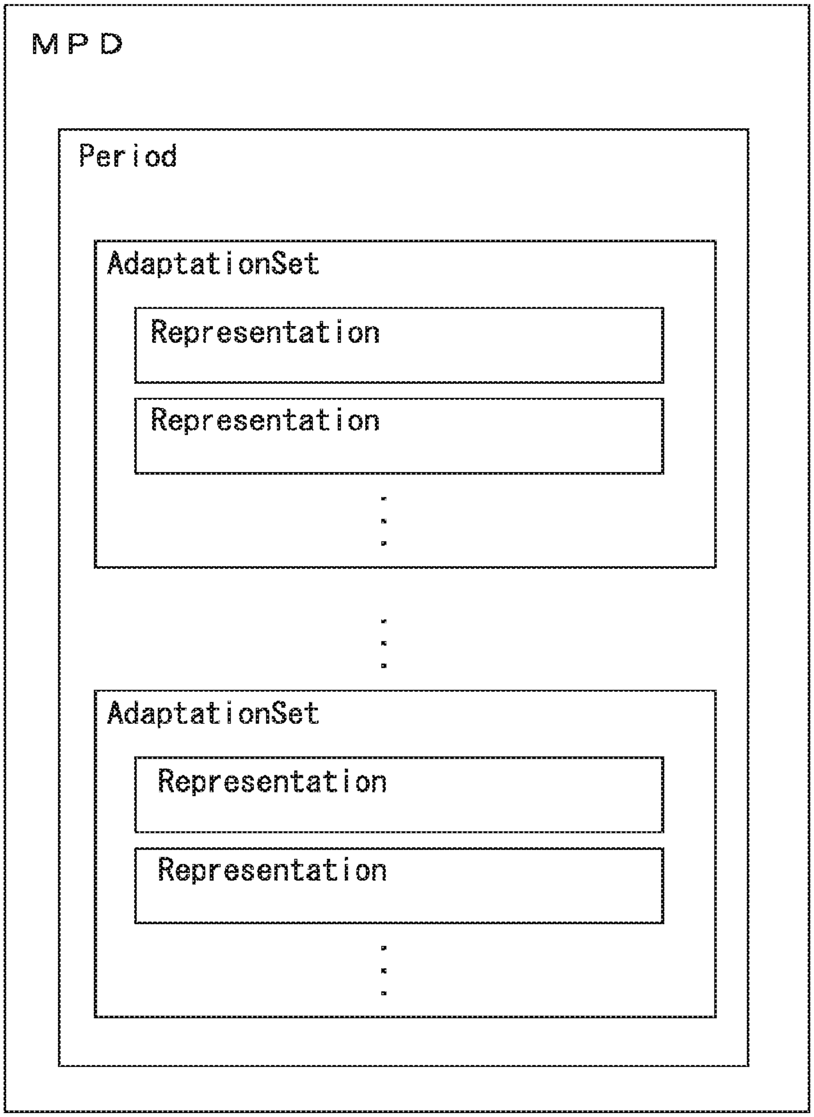
FIG. 15 is a diagram showing a data structure of MPD of MPEG-DASH.

FIG. 15 is a diagram showing a data structure of the MPD.

The MPD includes one Period below the MPD, AdaptationSet for each of the media types below the Period, and a plurality of Representation further below the AdaptationSet.

The hierarchy, i.e., the top hierarchy of the MPD includes information such as a starting point of the MPD, a title, a streaming type (on-demand/live distribution), and the length, as management information regarding one piece of moving image content.

The Period is a unit obtained by dividing one piece of moving image content by a time such as a frame. A start time and an end time are defined for the Period. The Period is configured by a plurality of AdaptationSet.

The AdaptationSet includes codec information regarding data for each of the media types (video, audio, subtitles, POI metadata) of the moving image content of each Period, information such as a language, and the like. The AdaptationSet includes, below the AdaptationSet, Representation for each of the pieces of data having different coding rates and image sizes.

The Representation includes information accumulated in a web server, such as coding rates, image sizes, places (URL), and the like of the segments having different coding rates, image sizes, and the like.

Figure 16:
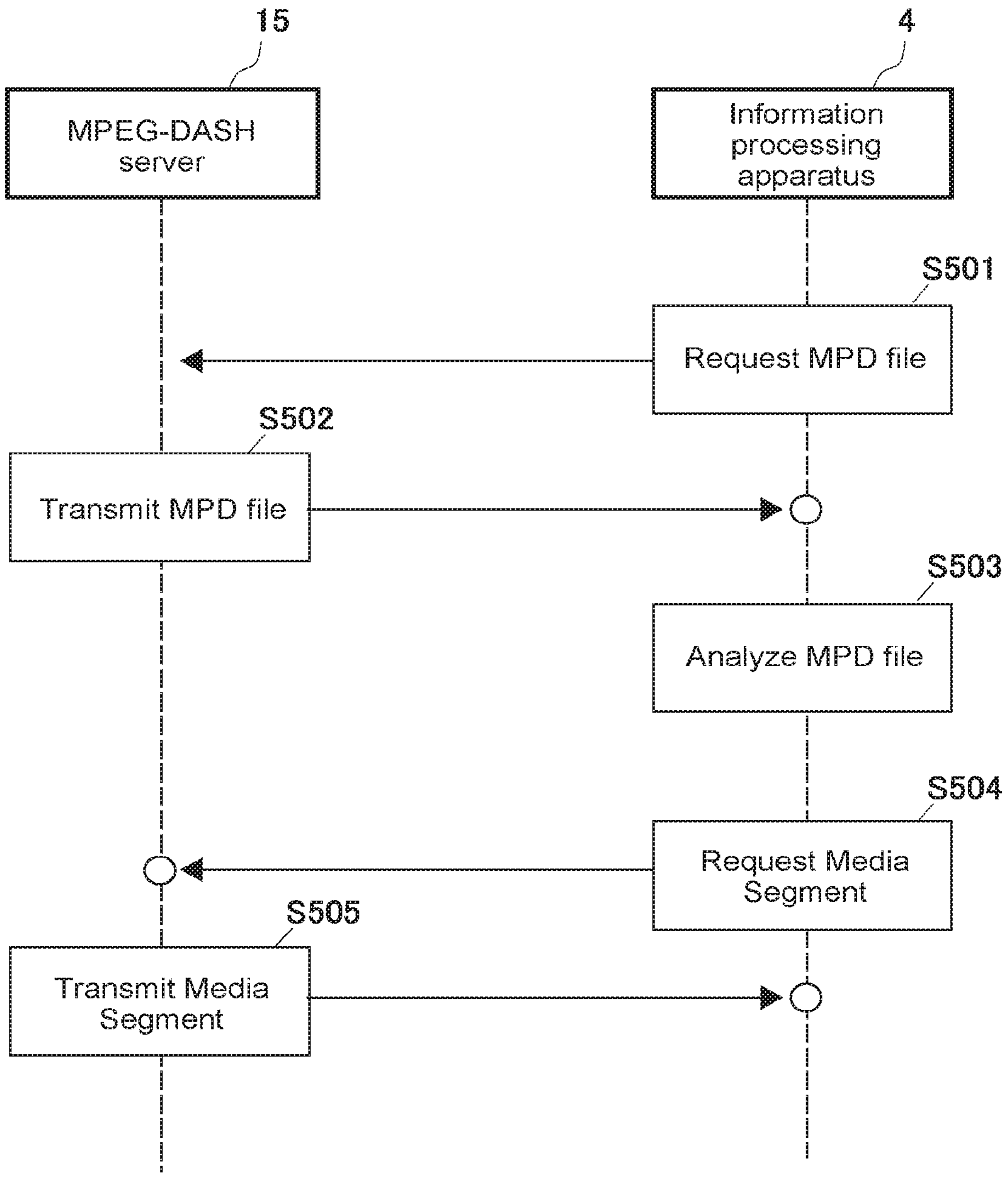
FIG. 16 is a diagram showing interaction between an MPEG-DASH server 15 and the information processing apparatus 4 via a network communication.

FIG. 16 is a diagram showing interaction between an MPEG-DASH server 15 and the information processing apparatus 4 via a network communication.

The MPD file and Media Segments of various types of media of the moving image content are stored in the MPEG-DASH server 15.

The CPU of the information processing apparatus 4 requests the MPEG-DASH server 15 to transmit an MPD file (Step S501). The MPEG-DASH server 15 transmits the MPD file to the information processing apparatus 4 in response to the request (Step S502). The CPU of the information processing apparatus 4 analyzes the received MPD file and confirms what coding rates and image sizes of Media Segments are prepared (Step S503). The CPU of the information processing apparatus 4 requests the MPEG-DASH server 15 to transmit a Media Segment having an optimum image size and coding rate in consideration of the analysis result of the MPD file, the screen size of the display, a state of a network traffic of a transmission path, and the like (Step S504). The MPEG-DASH server 15 transmits the Media Segment to the information processing apparatus 4 in response to the request (Step S505).

Next, to describe a relationship between the MPD and the Media Segment, the data structures of the moof box and the mdat box in the Media Segment will be described referring back to FIG. 14.

As described above, the Media Segment includes a plurality of Movie Fragents, and each Movie Fragent is configured by the moof box and the mdat box. In the mdat box, for example, the media data is divided into a plurality of Sample boxes by a time unit such as a frame and stored to be randomly accessible. In the moof box, metadata regarding presentation, such as information for generating a timing to present the media data of each Sample box of the mdat box, is stored.

As information for generating presentation start times PresentationTime (1), (2), (3), . . . , of the media data of respective Samples (1), (2), (3), . . . , BaseMediaDecodeTime is stored in a predetermined lower-level box (moof/traf box) of the moof box, and SampleCount (1), (2), (3), . . . , SampleDuration (1), (2), (3), . . . , and CompositionTimeOffset (1), (2), (3), . . . are further stored in another box (trun box) as information associated with the respective Sample (1), (2), (3) . . . . The BaseMediaDecodeTime is information of a relative time from the starting point of the Period to the starting point of the Movie Fragment. The SampleCount (1), (2), (3), . . . is the number of Samples, the SampleDuration (1), (2), (3), . . . is the length of Sample (1), (2), (3), . . . , and the CompositionTimeOffset (1), (2), (3), . . . is an adjustment time.

Next, the method of calculating the presentation start time PresentationTime of the Sample will be described.

Assuming that the presentation start time of the N-th Sample is PresentationTime(N), the PresentationTime(N) is calculated by BaseMediaDecodeTime+(sum of Sample(1), . . . , to the (N−1)th Sample(1), (N−1) SampleDuration(1), . . . , and (N−1))+(CompositionTimeOffset of N-th Sample)(N).

(Typical Presentation Control for MPEG-DASH Moving Image Content)

Figure 17:
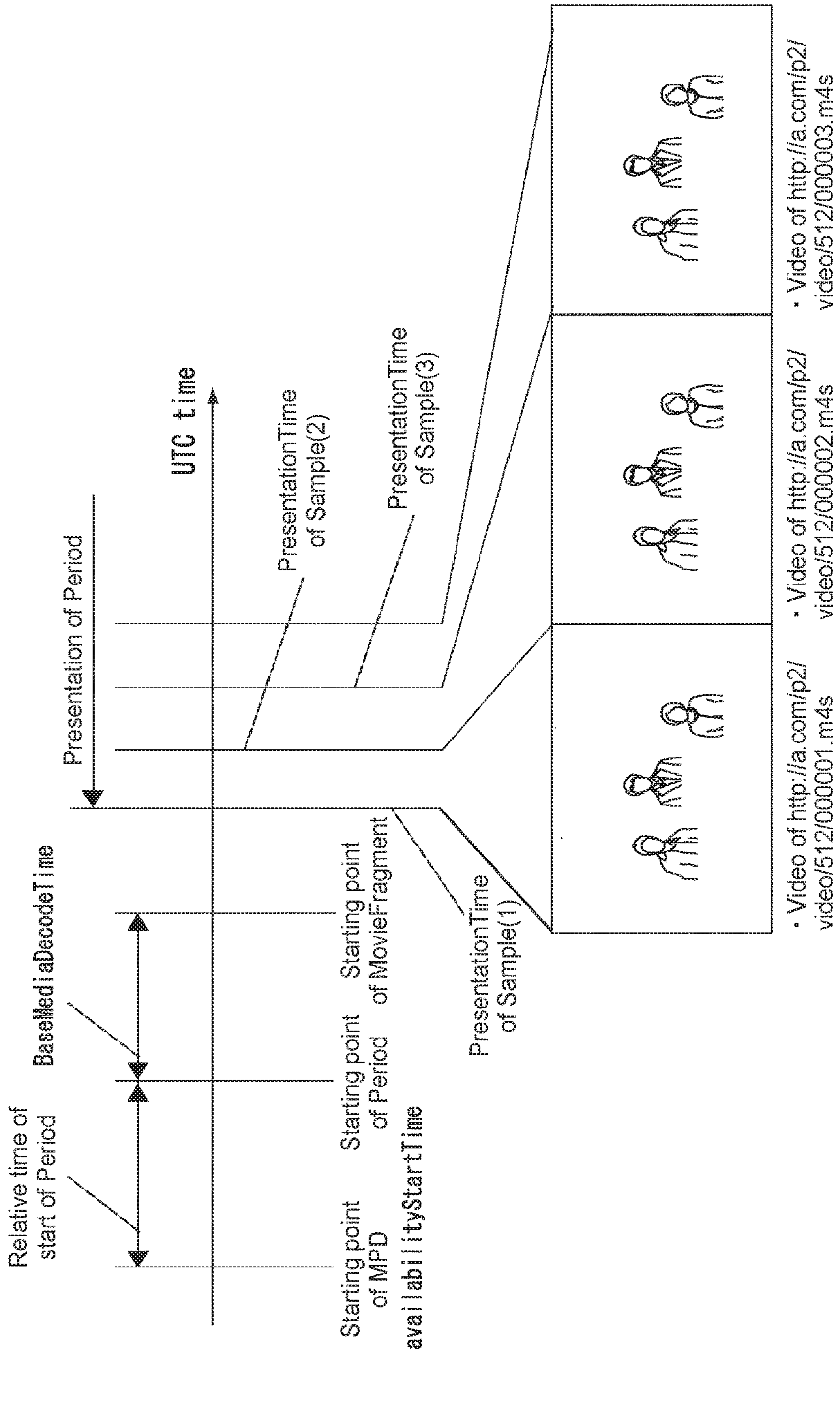
FIG. 17 is a diagram showing the flow of presentation control for MPEG-DASH moving image content.

FIG. 17 is a diagram showing the flow of the presentation control for the MPEG-DASH moving image content.

In the figure, the horizontal axis is assumed as the axis of real time (UTC time). The CPU of the information processing apparatus 4 generates a starting point of the first Period on the real time on the basis of a start time defined for Period as a relative time to the starting point of the MPD, with reference to the starting point of the MPD defined in the MPD file.

Subsequently, the CPU of the information processing apparatus 4 generates a starting point of Movie Fragment on the real time on the basis of BaseMediaDecodeTime, and further generates a presentation start time (PresentationTime (1)) of a first Sample (1) of the Period by using SampleCount, SampleDuration, and CompositionTimeOffset and starts presentation of the first Sample (1) from that time. Subsequently, the CPU of the information processing apparatus 4 similarly generates a presentation start time (PresentationTime(2)) of the next Sample (2) and switches a target to be presented at that time from the Sample (1) to the Sample (2). Hereinafter, the switching of presentation between Samples is similarly performed. In such a manner, the video of each Sample (1), (2), . . . is presented without being temporally interrupted.

In this embodiment, AdaptationSet corresponding to the POI metadata is added to the MPD file, and thus the presentation control for additional images can be performed by following the presentation control method for the MPEG-DASH moving image content as it is. This allows an additional image to be presented in synchronization with each medium such as video or audio of the MPEG-DASH moving image content.

Figure 18:
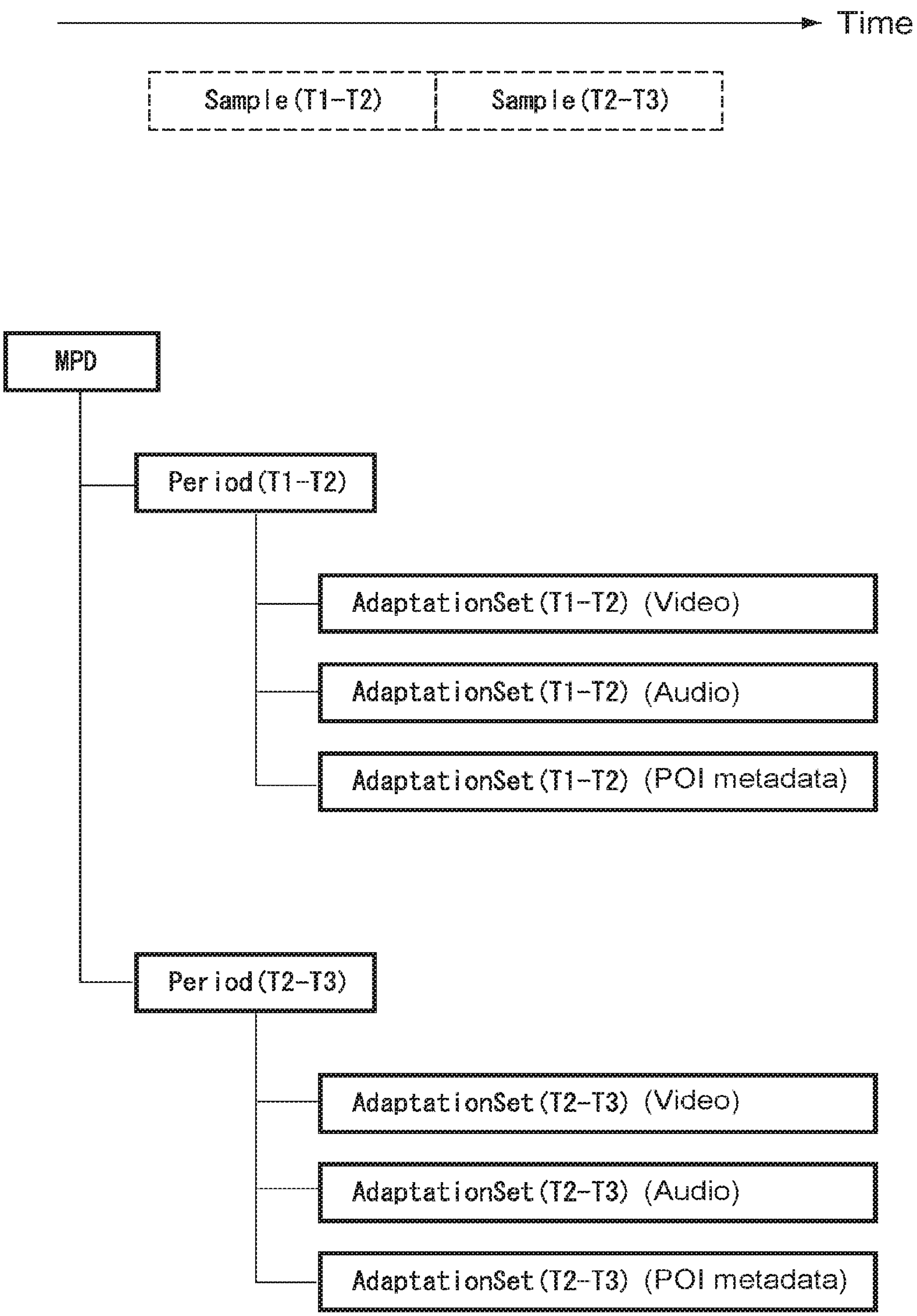
FIG. 18 is a diagram showing a configuration of the MPD to which AdaptationSet of the POI metadata is added.

For example, as shown in FIG. 18, in a case where the additional image is presented in synchronization with a video in Period (T1-T2) from T1 to T2 on the real time, AdaptationSet (T1-T2) of the POI metadata is added to the lower-level hierarchy of the Period (T1-T2) of the MPD. Furthermore, in a case where the additional image is presented in synchronization with a video in Period (T2-T3) from T2 to T3 on the real time, AdaptationSet (T2-T3) of the POI metadata is added to the lower-level hierarchy of the Period (T2-T3) of the MPD.

Figure 19:
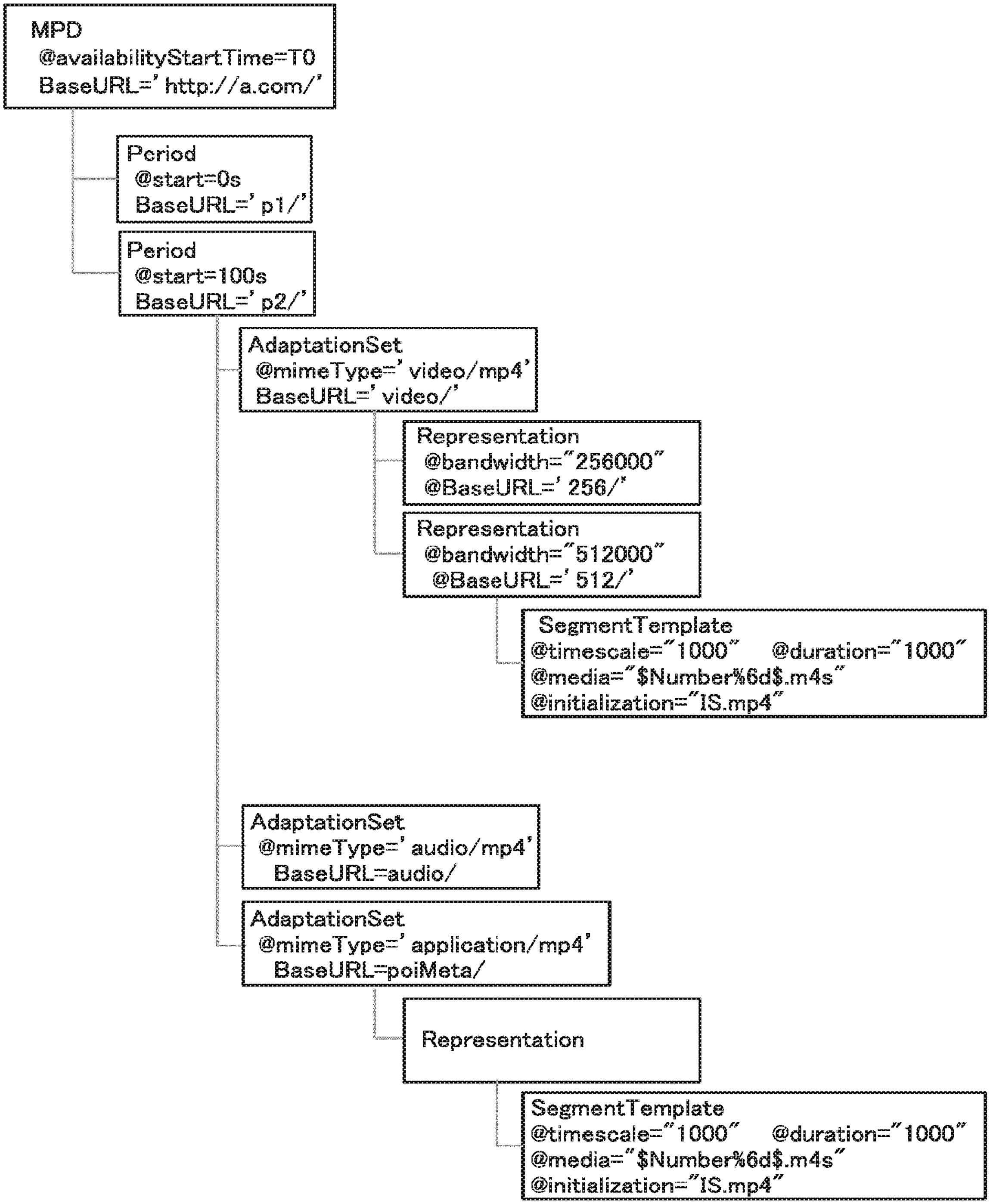
FIG. 19 is a diagram showing a more specific example of the MPD to which AdaptationSet of the POI metadata is added.

FIG. 19 is a diagram showing a more specific example of an MPD to which AdaptationSet of the POI metadata is added.

In the top hierarchy of the MPD, @avAIlabilityStartTime=T0 is described. This indicates that the starting point of the moving image content time is T0. In the lower-level hierarchy thereof, two Periods are stored. Of the two Periods, the first Period is defined to be started at 0 sec after the starting point of T0, and the second Period is defined to be started at 100 sec after the starting point of T0.

In this example, AdaptationSets of the video, the audio, and the POI metadata are present as AdaptationSet of the second Period. In the lower-level hierarchy of AdaptationSet of the video, two Representations indicating different coding rates (256 Kbps/512 Kbps) are present. In the lower-level hierarchy of each Representation, SegmentTemplate is present, in which a method of generating a URL indicating a place for Media Segment of the video, an acquisition cycle, and the like are described.

Here, "@timescale="1000"" and "@duration="1000"" mean that, if the value of 1000 minutes in the time scale of 1/1000 seconds, i.e., one second is set as a segment time length, the video can be acquired in the cycle of this segment time length. "@Media="$Number %6d$.m4s"" indicates the method of generating the lowermost value of the URL showing the place for the video of each Sample, and specifically means an integer of a value having six digits, which increases from 1. For example, the URL of the Sample is generated by connecting the value, which is shown by "BaseURL" described in each element of the MPD, to the path format and adding the value having six digits, which is generated by "@Media="$Number %6d$.m4s"", to the end of the URL. In other words, the URL of the first Sample of the video is created as "HTTP://a.com/p2/video/512/000001.m4s".

"@initialization="IS.mp4"" is a value used for the URL of Initialization Segment of the first Media Segment of the video. The URL of Initialization Segment is also generated by connecting the value, which is shown by "BaseURL" described in each element of the MPD, to the path format and adding "IS.mp4" to the end of the URL. For example, the URL of Initialization Segment is created as "HTTP://a.com/p2/video/512/IS.mp4".

In the lower-level hierarchy of AdaptationSet of the POI metadata, Representation is present, and in the further lower-level hierarchy thereof, SegmentTemplate is present, in which a method of generating a URL indicating a place for Media Segment of the POI metadata, an acquisition cycle, and the like are described. The method of generating a URL indicating a place for Media Segment of the POI metadata may be the same as the method of generating the URL indicating the place for Media Segment of the video. Additionally, a method of generating a URL indicating a place for Initialization Segment of the POI metadata may also be the same as the method of generating the URL indicating the place for Initialization Segment of the video. Initialization Segment of the POI metadata includes information for identifying the POI metadata stored as Sample in the Media Segment. Specifically, if the value of a handler_type field of moov(MovieBox)/trak(TrackBox)/mdia(MediaBox)/hdlr(Handl erBox) of Initialization Segment is "meta", it is possible to identify the POI metadata stored as Sample in the Media Segment.

The CPU of the information processing apparatus 4 can acquire each of the video, the audio, and the POI metadata of the moving image content in the unit of Sample on the basis of the URL generated as described above.

Figure 20:
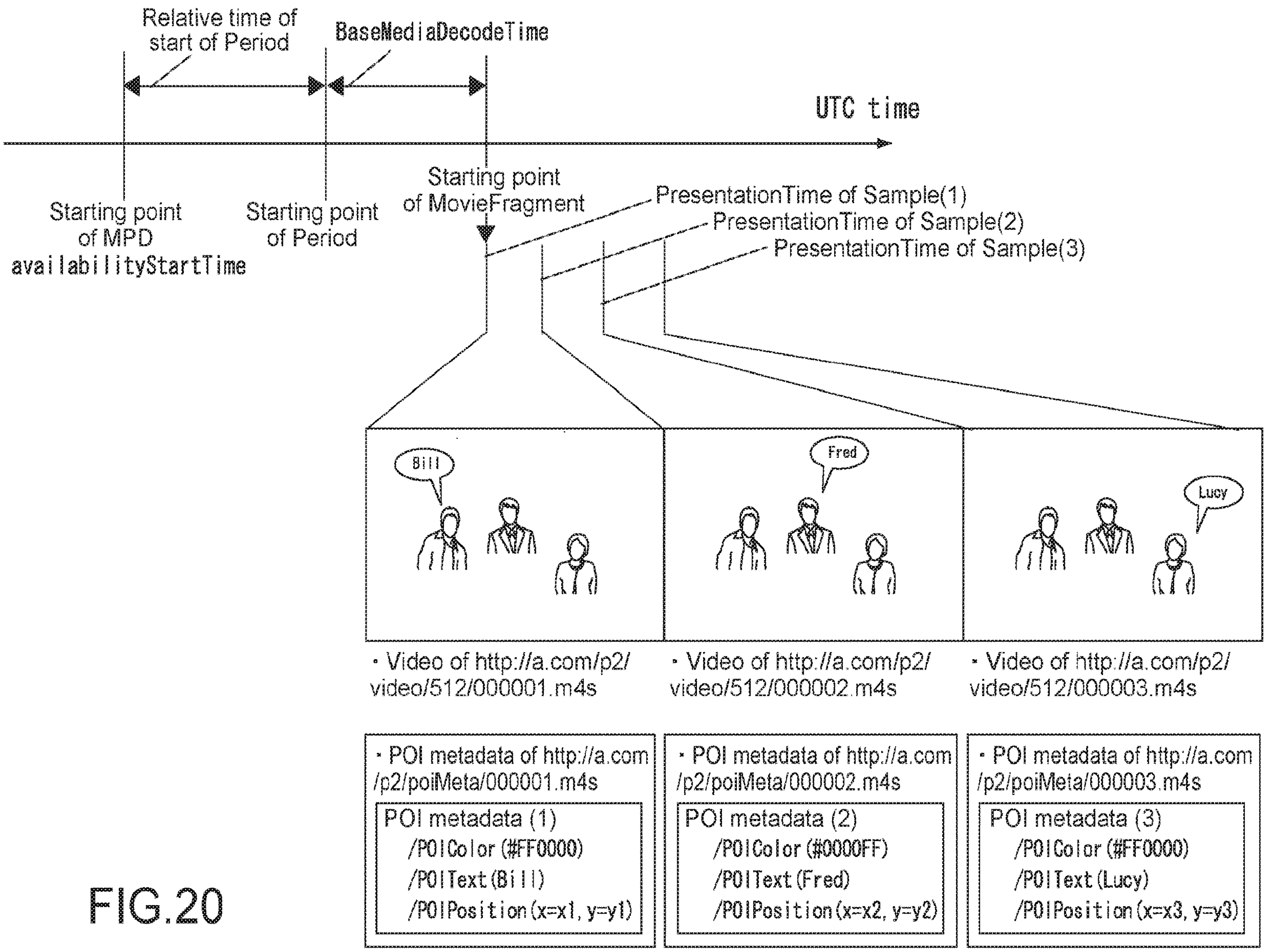
FIG. 20 is a diagram showing the flow of presentation for a video and additional images on the basis of the MPD.

FIG. 20 is a diagram showing the flow of the presentation for a video based on the MPD and an additional image.

The processing of presenting each of Samples (1), (2), and (3) of the video is as described above. Here, the CPU of the information processing apparatus 4 performs presentation processing for additional images on the basis of POI metadata (1) from a presentation start time (PresentationTime) (1) on the real time of the first Sample (1) of the video to a presentation start time (PresentationTime) (2) on the real time of the next Sample (2). Subsequently, the CPU of the information processing apparatus 4 performs presentation processing for additional images on the basis of POI metadata (2) from the presentation start time (PresentationTime) (2) on the real time of the Sample (2) to a presentation start time (PresentationTime) (3) on the real time of the next Sample (3). Furthermore, the CPU of the information processing apparatus 4 performs presentation processing for additional images on the basis of POI metadata (3) from the presentation start time (PresentationTime) (3) on the real time of the Sample (2) to a presentation start time (PresentationTime) (4) on the real time of the next Sample (3).

As described above, in this embodiment, the AdaptationSet for the POI metadata is added to the MPD file, and thus the presentation control for additional images on the basis of the POI metadata can be performed using the same mechanism as the presentation control for other types of media such as video and audio, and the additional images can also be presented correctly in synchronization with other types of media such as video and audio.

(Movement of Presentation Position of Additional Image)

Figure 21:
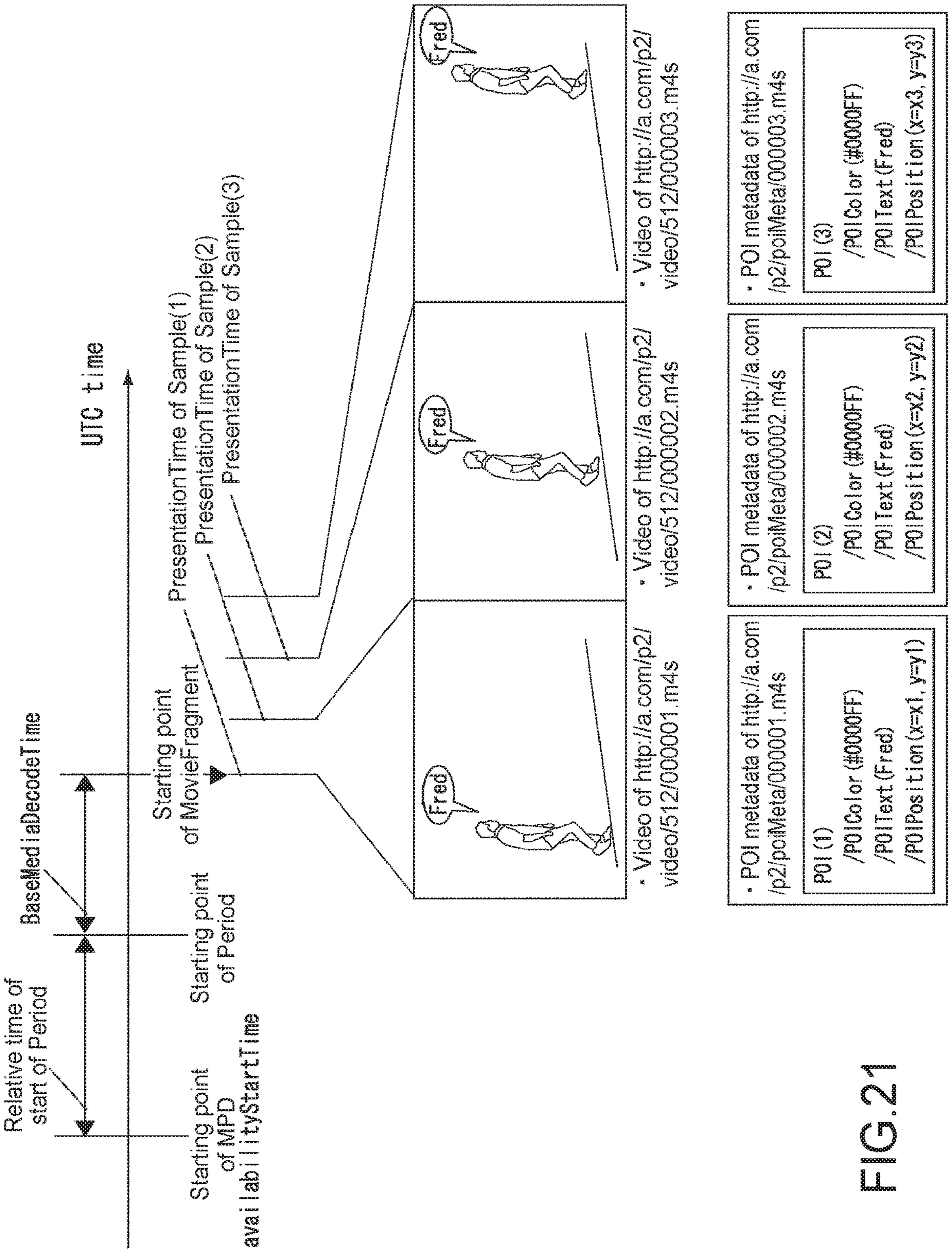
FIG. 21 is a diagram showing the POI metadata in a case where a presentation position of the additional image is moved along the movement of a service object.

FIG. 21 is a diagram showing the POI metadata in a case where a service object in the video moves with time, and a presentation position of an additional image is also moved along with the movement of the service object.

Here, T1 is a presentation start time of an additional image based on the POI metadata (1), T2 is a presentation start time of an additional image based on the POI metadata (2), and T3 is a presentation start time of an additional image based on the POI metadata (3). T1-T2 is a presentation period for the additional image based on the POI metadata (1), and during this period, the additional image is presented at a position indicated by a value of POIPosition element, (x=x1, y=y1), in the POI metadata (1). T2-T3 is a presentation period for the additional image based on the POI metadata (2), and during this period, the additional image is presented at a position indicated by a value of POIPosition element, (x=x2,y=y2), in the POI metadata (2). T3-T4 is a presentation period for the additional image based on the POI metadata (3), and during this period, the additional image is presented at a position indicated by a value of POIPosition element, (x=x3,y=y3), in the POI metadata (3).

In such a manner, the value of the POIPosition element in the POI metadata of each Sample is determined in accordance with the position of the moving service object, and thus the presentation position of the additional image can be moved correctly in synchronization with the movement of the service object.

(Presentation Updating Control Over Plurality of Sample Times of POI Metadata)

Figure 22:
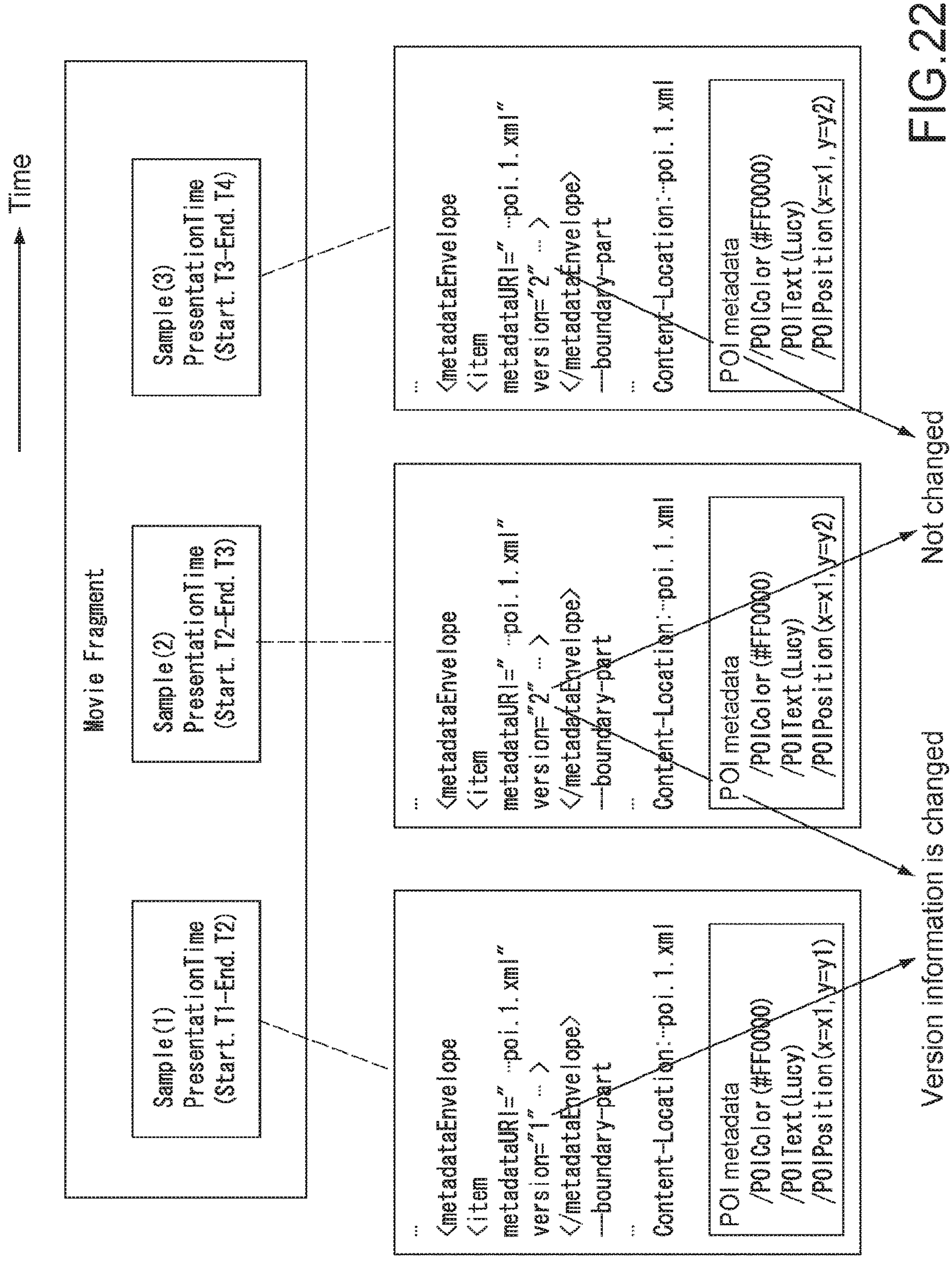
FIG. 22 is a diagram for describing presentation updating control across a plurality of sample times of the POI metadata.

It has been assumed hereinabove that the presentation control for additional images is performed while associating the video of each Sample with the POI metadata one-on-one, but one piece of POI metadata may be applied to the video of a plurality of continuous Samples. In this case, as shown in FIG. 22, version information (Version) is added to a value of an identifier (metadataURI) of the POI metadata described in the packages 66, 67, and 68 storing files 63, 64, and 65 of the POI metadata. In a case where the details are not changed from the immediately preceding POI metadata, the version information is assumed to have the same value as the version information described in a package storing the immediately preceding POI metadata, and in a case where the details are changed from the immediately preceding POI metadata, the version information is set to an incremented value.

Thus, in switching between Samples of the video, in a case where a value of each piece of version information is changed before and after the switching, the application of the application execution environment 43 performs computation for the presentation for additional images based on the POI metadata, and in a case where a value of each piece of version information is not changed, the additional image is continued to be presented without performing anew computation for the presentation for additional images based on the POI metadata. This allows the load of computation for the presentation for additional images to be reduced.

For example, as shown in FIG. 22, the value of the version information added to the identifier (metadataURI) of the POI metadata (1) corresponding to the video of Sample (1) is "1", the value of the version information added to the identifier (metadataURI) of the POI metadata (2) corresponding to the video of the second Sample (2) is "2", and the value of the version information added to the identifier (metadataURI) of the POI metadata (3) corresponding to the video of the third Sample (3) is "2". In this case, in switching between the video of the second Sample (2) and the video of the third Sample (3), the additional image added to the video of the second Sample (2) is continued to be presented as it is also on the video of the third Sample (3) without performing computation for the presentation for additional images on the basis of the POI metadata (3) corresponding to the video of the third Sample (3).

(Charging Restriction for Using Voice Assistant Service Regarding Specific Service Object)

While the voice assistant service regarding various service objects appearing in moving image content is provided to the user, restriction that needs charging may be provided in a case where the user uses a voice assistant service regarding a specific service object.

To achieve the use restriction for a voice assistant service regarding a specific service object as described above, as shown in FIG. 6, the POI use restriction information is described in the POI metadata. For the POI use restriction information, for example, the ODRL (Open Digital Rights Language)) or the like is used as a description language regarding access control. The ODRL is a rights language capable of describing use conditions and requirements for optional content, details of an agreement between a right holder and a user, and the like.

FIG. 23 is a description example of the POI use restriction information by the ODRL.

In the POI use restriction information by the ODRL, access information 231 such as a URL necessary for accessing a server that performs charging management, an identifier 232 of target POI metadata, an access use restriction target user 23, an access use restriction releasing condition 234, and the like are described. In other words, the POI use restriction information in this example has the following meaning: "a user who wants to receive a voice assistant service for this POI needs to pay a broadcast station of a program A, as a holder of the POI metadata, one US dollar."

Figure 24:
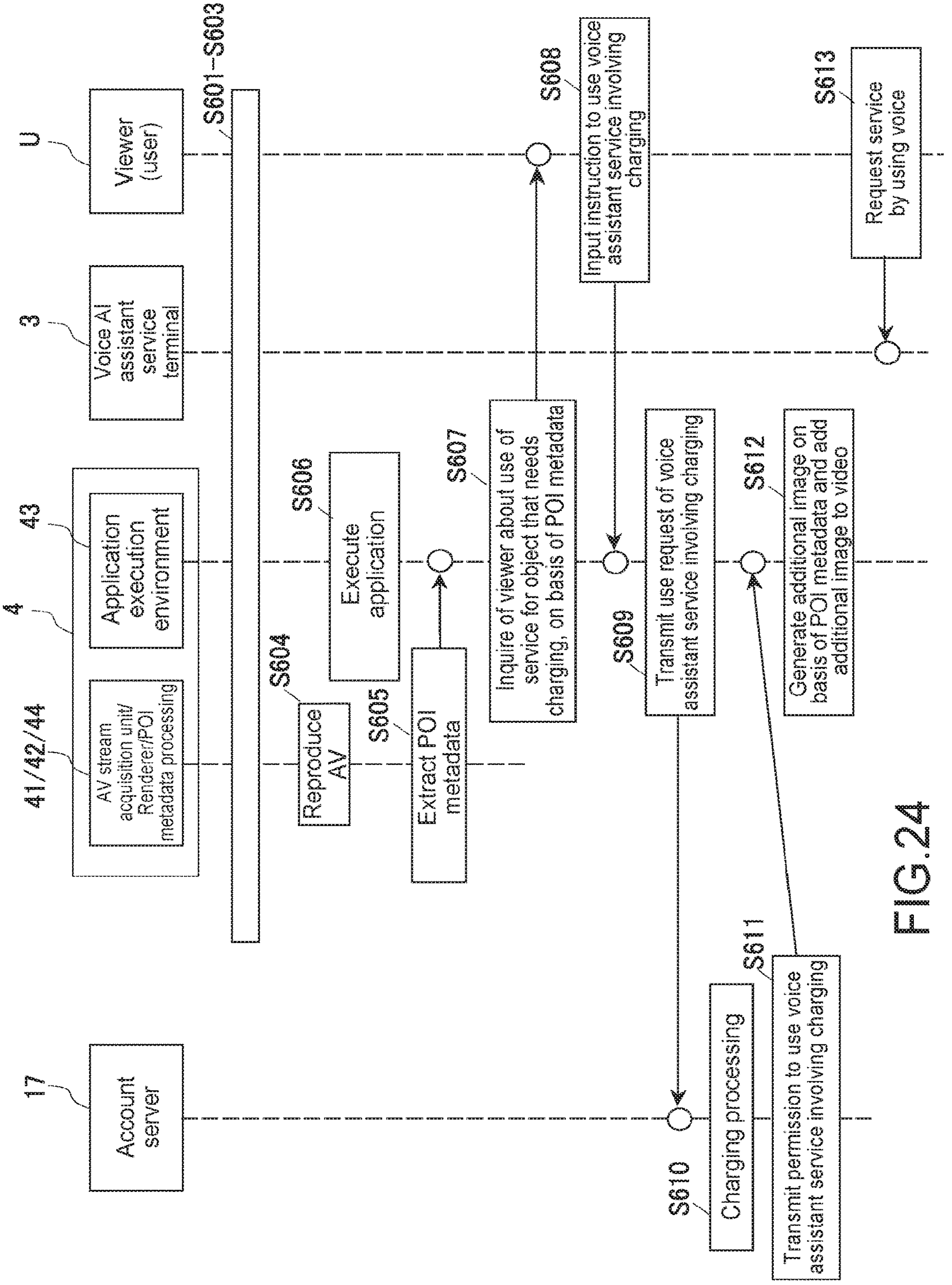
FIG. 24 is a sequence diagram showing an operation of charging restriction for using a voice assistant service.

Next, an operation of the charging restriction for using a voice assistant service regarding a specific service object will be described with reference to FIG. 24.

Step S601 to Step S603 are steps for the information processing apparatus 4 to acquire data of moving image content, POI metadata, and an application. The flow of acquiring the data of the moving image content, the POI metadata, and the application may be any of the overall operation flows (part 1, 2, and 3) shown in FIGS. 2, 3, and 4. In this example, for example, the POI metadata is supplied from the POI metadata server 13 to the moving image content server 11 via the broadcast/network distribution system 2, and the application is distributed from the application server 12 to the information processing apparatus 4 via the broadcast/network distribution system 2. It is assumed that the POI metadata and the data of the moving image content are then gathered in a predetermined data structure in the moving image content server 11 and then distributed to the information processing apparatus 4 via the broadcast/network distribution system 2.

In the information processing apparatus 4, the data of the moving image content is extracted from the received data structure, the extracted data of the moving image content is decoded in the AV stream acquisition unit 41, and the resultant video data and audio data are respectively supplied to the display 45 and the speaker 46 via the renderer 44 (Step S604).

Additionally, in the information processing apparatus 4, the POI metadata is extracted from the received data structure by the POI metadata processing module 42 (Step S605) and supplied to the application execution environment 43. The application execution environment 43 inquires of the user U about whether the user U wants to use a voice assistant service regarding a specific service object based on the POI metadata, on the basis of the POI use restriction information described in the POI metadata (Step S607). The inquiry to the user U may be performed using, for example, the display 45 and the speaker 44 connected to the information processing apparatus 4. In this inquiry, an access use restriction releasing condition and the like, which are described in the POI use restriction information, are presented to the user U. With reference to the presented details, the user U can input an instruction to use the voice assistant service involving charging or cancel it to the information processing apparatus 4 (Step S608).

In a case where the user U inputs an instruction to use the voice assistant service involving charging to the information processing apparatus 4, the application execution environment 43 transmits a use request of the voice assistant service, which includes at least the user identification information of the user U and the POI use restriction information, to an account server 17. The account server 17 is a server that performs charging processing regarding the use of the voice assistant service. When receiving the use request of the voice assistant service from the information processing apparatus 4, the account server 17 performs charging processing on the basis of the user identification information, the POI use restriction information, and the like included in the use request (Step S610), and on completion of the charging processing, transmits a consent for use of the voice assistant service involving charging to the information processing apparatus 4 (Step S611).

When receiving the consent for use of the voice assistant service involving charging from the account server 17, the application execution environment 43 of the information processing apparatus 4 generates an additional image, which informs the user U about a service object in the video, on the basis of the POI metadata, and supplies the additional image to the renderer 44. Thus, a synthesized image in which the additional image is superimposed on the video of the program is obtained and displayed on the display 45 (Step S612).

Note that, for service objects on which the use restriction is not imposed by the POI use restriction information in the POI metadata, the above-mentioned inquiry to the user U is not performed, and an additional image is synthesized in the video.

Subsequently, the user U gives a service request, through voice, for the service object for which the additional image is presented in the video displayed on the display 45, to the voice AI assistant service terminal 3, and uses the voice AI assistant service (Step S613).

In such a manner, the charging restriction in a case where the user uses a voice assistant service regarding a specific service object can be achieved.

(Time Shift Reproduction Using Bookmarks)

In the information processing system 100 of this embodiment, the user can register a bookmark for a scene with an optional additional image in an interval of the moving image content being viewed, in which a voice assistant service is usable, and can reproduce the scene with the additional image at an optional later timing on the basis of the bookmark selected by the user. Hereinafter, such a function is referred to as a "time shift reproduction using bookmarks".

Here, registration of a bookmark for a scene with an additional image is performed by saving the POI metadata, which is used to generate the additional image appearing in the scene with that additional image. As shown in FIG. 6, the POI metadata includes a URI of target content and a presentation time (start time, end time) of the additional image, and thus by using those pieces of information, the information processing apparatus 4 can request the moving image content server 11 to distribute the data of the moving image content, which is necessary to present a scene with an additional image for which the bookmark is registered.

Figure 25:
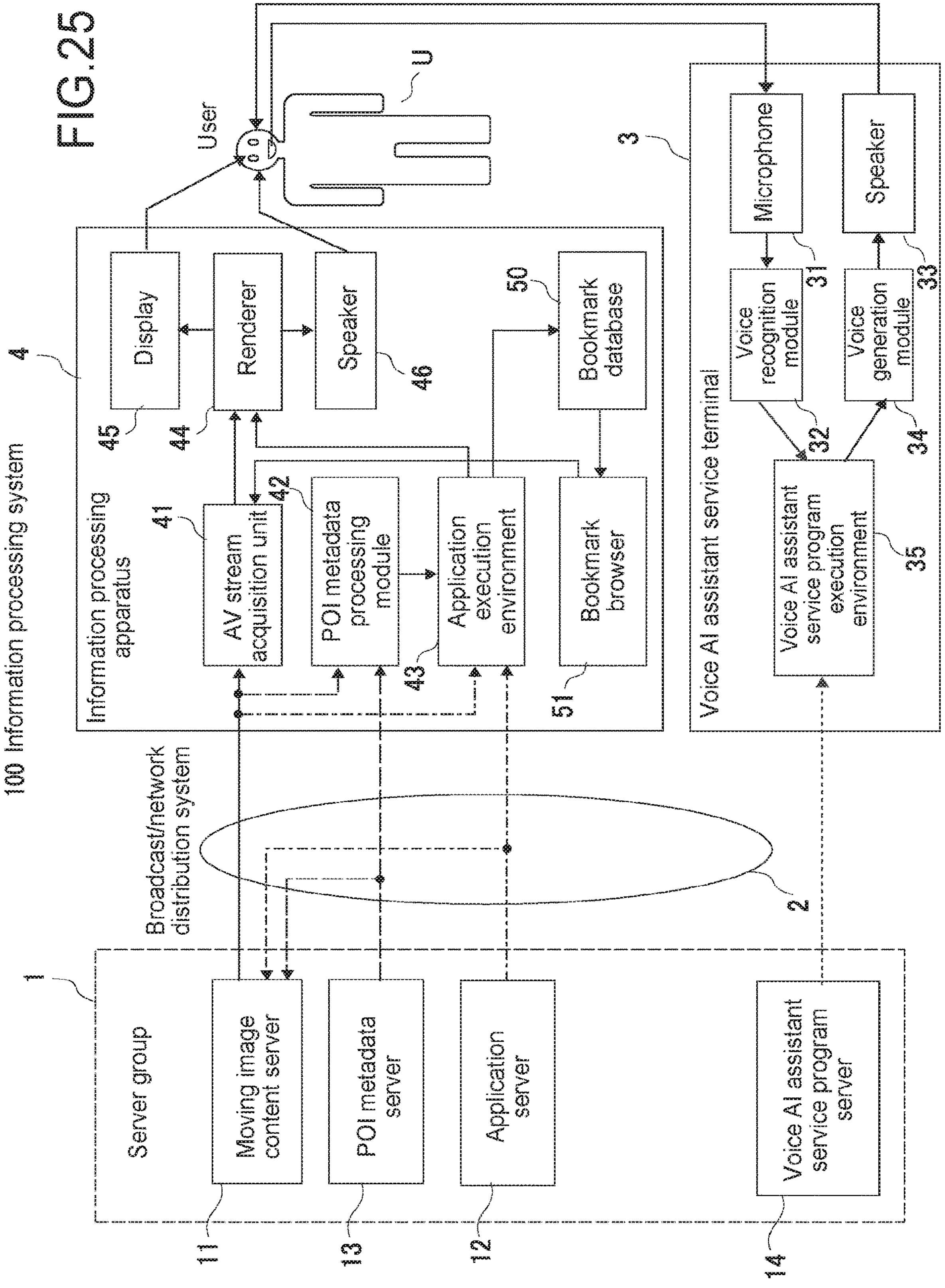
FIG. 25 is a block diagram showing a configuration related to a time shift reproduction using bookmarks in the information processing system 100 of this embodiment.

FIG. 25 is a block diagram showing a configuration related to a time shift reproduction using bookmarks in the information processing system 100 of this embodiment.

As shown in FIG. 25, the information processing system 100 includes a bookmark database 50 and a bookmark browser 51, as the configuration related to the time shift reproduction using bookmarks.

The bookmark database 50 is a database that saves the POI metadata used to generate an additional image in a scene with an additional image for which a bookmark is registered.

The bookmark browser 51 reads the POI metadata from the bookmark database 50, the POI metadata corresponding to the bookmark selected by the user U from registered bookmarks and, on the basis of the POI metadata, performs processing of requesting the moving image content server 11 to distribute, by streaming, moving image content that needs the time shift reproduction, via the AV stream acquisition unit 41.

In response to the request given from the bookmark browser 51, the AV stream acquisition unit 41 accesses the moving image content server 11, requests streaming distribution of the moving image content that needs the time shift reproduction, and acquires and decodes the stream of the moving image content.

Figure 26A:
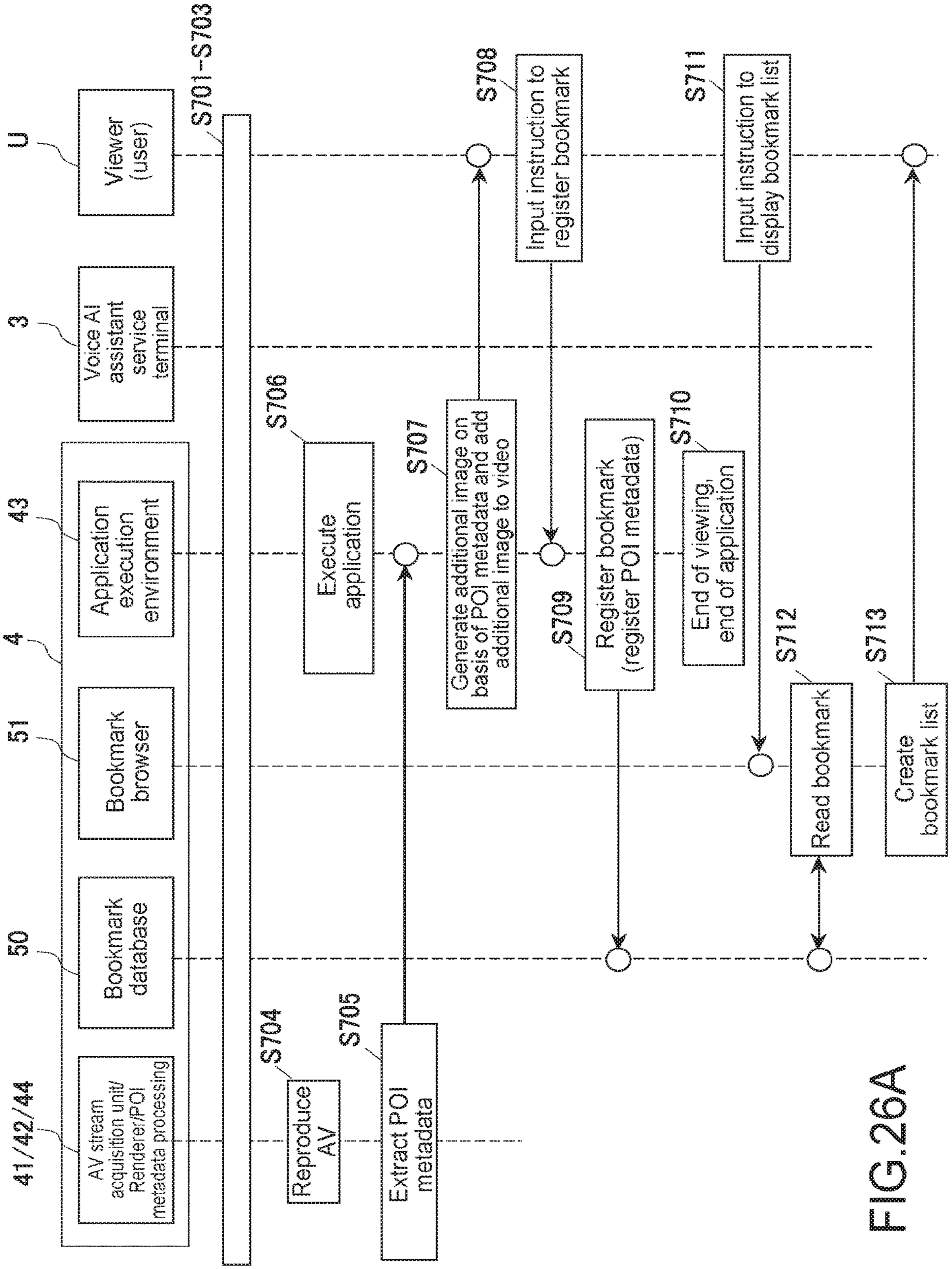
FIG. 26A is a sequence diagram showing the flow of the time shift reproduction using bookmarks.
Figure 26B:
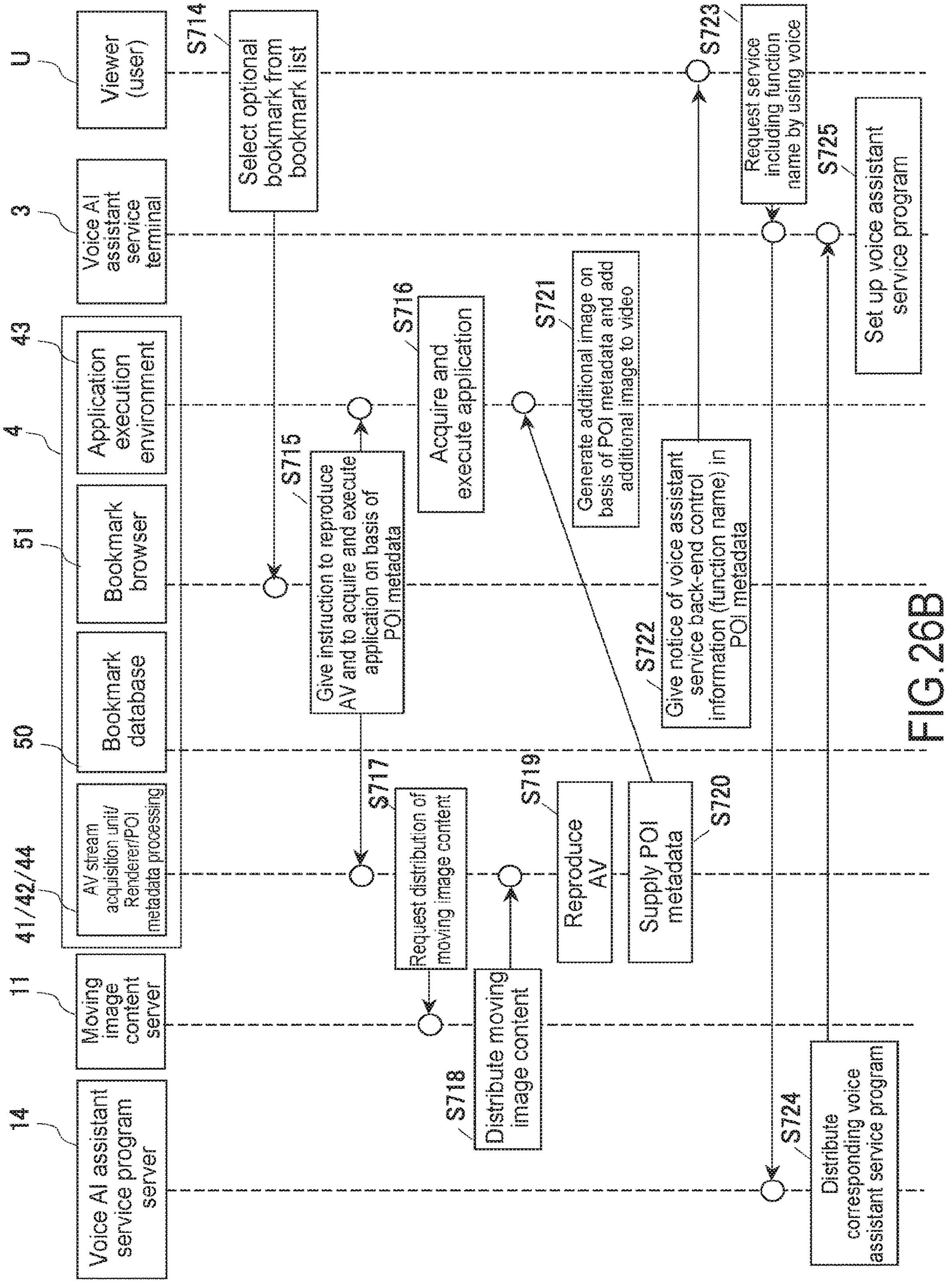
FIG. 26B is a sequence diagram following FIG. 26A and showing the flow of the time shift reproduction using bookmarks.

FIGS. 26A and 26B are sequence diagrams each showing the flow of the time shift reproduction using bookmarks.

Step S701 to Step S703 are steps for the information processing apparatus 4 to acquire the data of the moving image content, the POI metadata, and the application. The flow of acquiring the data of the moving image content, the POI metadata, and the application may be any of the overall operation flows (part 1, 2, and 3) shown in FIGS. 2, 3, and 4. In this example, for example, the POI metadata is supplied from the POI metadata server 13 to the moving image content server 11 via the broadcast/network distribution system 2, and the application is distributed from the application server 12 to the information processing apparatus 4 via the broadcast/network distribution system 2. It is assumed that the POI metadata and the data of the moving image content are then gathered in a predetermined data structure in the moving image content server 11 and then distributed to the information processing apparatus 4 via the broadcast/network distribution system 2.

In the information processing apparatus 4, the data of the moving image content is extracted from the received data structure, the extracted data of the moving image content is decoded in the AV stream acquisition unit 41, and the resultant video data and audio data are respectively supplied to the display 45 and the speaker 46 via the renderer 44 (Step S704).

Additionally, in the information processing apparatus 4, the POI metadata is extracted from the received data structure by the POI metadata processing module 42 (Step S705) and supplied to the application execution environment 43. The application execution environment 43 generates an additional image, which informs the user U about a service object in the video, on the basis of the POI metadata, and supplies the additional image to the renderer 44. Thus, a synthesized image in which the additional image is superimposed on the video of the program is obtained and displayed on the display 45 (Step S707).

Here, it is assumed that the user U inputs an instruction to register a bookmark for a scene with an additional image, which is being viewed, to the information processing apparatus 4 (Step S708). Here, a scene for which a bookmark can be registered is a scene with an additional image, information of which can be provided to the user U by the voice assistant service.

When receiving the instruction to register a bookmark from the user U, the application execution environment 43 saves the POI metadata in the bookmark database 50 to register this bookmark (Step S709). At that time, the POI metadata saved in the bookmark database 50 is POI metadata used to generate the additional image in the scene with the additional image, which is being reproduced when an instruction to register a bookmark is received from the user U.

Subsequently, when the distribution, reproduction, and viewing of the moving image content end, the application execution environment 43 ends (Step S710).

The operation so far is the bookmark registration during viewing of the moving image content, and after such an operation, the user U can select one optional bookmark from the registered bookmarks and give an instruction to perform a time shift reproduction of a scene with an additional image linked with that bookmark.

For example, the user U inputs an instruction to display a bookmark list, which is a list of bookmarks, to the information processing apparatus 4 at an optional timing after the viewing of the moving image content ends (Step S711). When detecting that such an instruction is given, the bookmark browser 51 reads all the POI metadata, which are linked with all the bookmarks regarding the moving image content that has been viewed, from the bookmark database 50 (Step S712). The bookmark browser 51 creates a bookmark list on the basis of all the read POI metadata and displays the bookmark list on the display 45 via the renderer 44 (Step S713). The details of the bookmark list will be described later.

Referring to FIG. 26B, the user U inputs an instruction to select an optional bookmark from the bookmark list displayed on the display 45 to the information processing apparatus 4 (Step S714). The bookmark browser 51 receives the instruction to select the optional bookmark from the user U and instructs the AV stream acquisition unit 41 to request the moving image content server 11 to provide a stream of moving image content necessary for the time shift reproduction of a scene with an optional additional image, on the basis of a URI of target content and a presentation time (start time, end time) of the additional image, which are described in the POI metadata linked with the selected bookmark (Step S715). In accordance with the instruction, the AV stream acquisition unit 41 requests distribution of the data of the moving image content corresponding to the scene with the additional image (Step S717). Furthermore, the bookmark browser 51 instructs the AV stream acquisition unit 41 to acquire an application to be executed by the application execution environment 43, on the basis of the URL of the POI presentation application described in the POI metadata, and passes the application acquired by the AV stream acquisition unit 41 to the application execution environment 43 for execution of the application (Step S716).

The moving image content server 11 distributes the data structure, which includes the data of the moving image content and the POI metadata that correspond to the scene with the additional image selected by the user U, to the information processing apparatus 4 in response to the request for distribution from the information processing apparatus 4 (Step S718).

In the information processing apparatus 4, the data of the moving image content is extracted from the data structure received in the AV stream acquisition unit 41, the extracted data of the moving image content is decoded in a decoder within the AV stream acquisition unit 41 (Step S719), and the resultant video data and audio data are respectively supplied to the display 45 and the speaker 46 via the renderer 44.

Additionally, in the information processing apparatus 4, the POI metadata is extracted from the received data structure by the POI metadata processing module 42 (Step S720) and is supplied to the application execution environment 43. The application execution environment 43 generates, on the basis of the POI metadata, an additional image for informing the user U about a service object in the video, and supplies the additional image to the renderer 44. Thus, a synthesized image in which the additional image is superimposed on the video of the program is obtained and displayed on the display 45 (Step S721). Thus, the time shift reproduction of the scene with the additional image linked with the bookmark selected by the user is performed.

The user U then gives a service request, through voice, for the service object for which the additional image is presented in the video displayed on the display 45, to the voice AI assistant service terminal 3, and can use the voice AI assistant service.

Here, in a case where the data of the moving image content is distributed to the information processing apparatus 4 from the moving image content server 11 in a predetermined schedule, a necessary voice AI assistant service program may be supplied from the voice AI assistant service program server 14 to the voice AI assistant service terminal 3 in accordance with the schedule to distribute the data of the moving image content. This guarantees that an appropriate voice assistant service program is set up in the voice AI assistant service program execution environment 35 of the voice AI assistant service terminal 3. To the contrary, in the time shift reproduction of a scene with an additional image, there is no guarantee that an appropriate voice assistant service program is set up in the voice AI assistant service program execution environment 35 of the voice AI assistant service terminal 3.

In this regard, this embodiment employs a mechanism in which voice assistant service back-end control information that defines a voice assistant service program corresponding to a function to be used, for example, a function name, is described in the POI metadata, is presented to the user U in the time shift reproduction, and is provided to the voice AI assistant service terminal 3 through voice, and thus the voice AI assistant service terminal 3 requests the voice AI assistant service program server 14 to provide a necessary voice assistant service program on the basis of the voice assistant service back-end control information. Such voice assistant service back-end control information is incorporated in a service request from the user U through voice and is given to the voice AI assistant service terminal 3 (Step S723).

Figure 27:
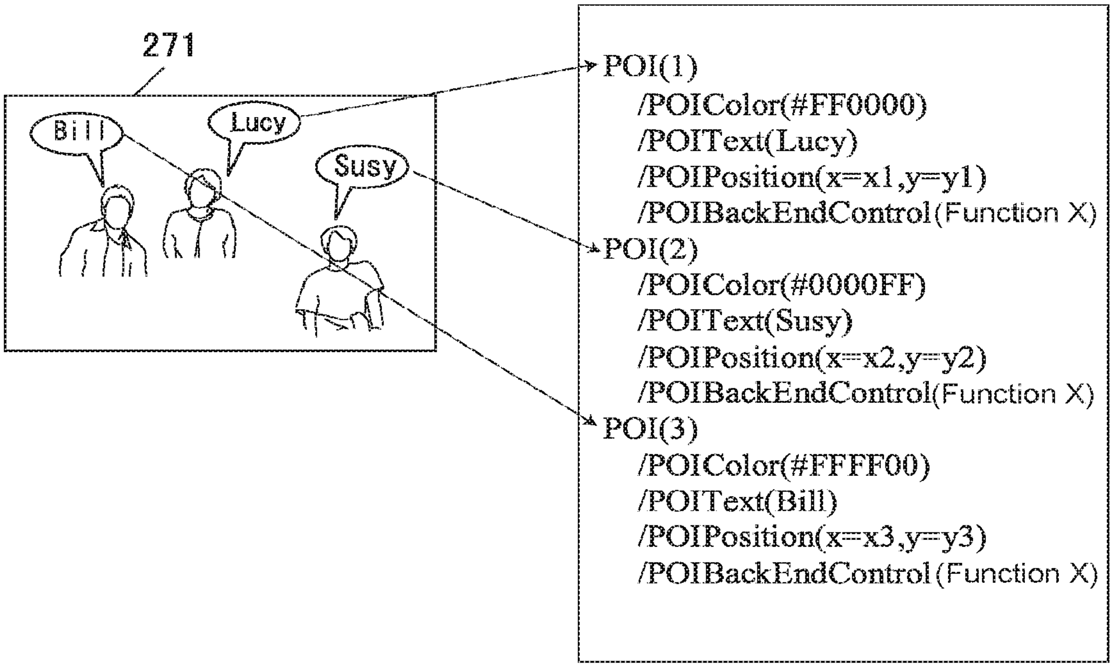
FIG. 27 is a diagram showing an example of the POI metadata linked with a certain bookmark.

FIG. 27 is a diagram showing an example of the POI metadata linked with a certain bookmark. This example shows a case where three service objects appearing in a scene 271 respectively have POI metadata (1), (2), and (3). For each of the POI metadata (1), (2), and (3), a common "function X" is defined as a function name of the voice assistant service back-end control information.

A service request including the voice assistant service back-end control information (for example, "function X"), which is provided by the user U through voice by using the microphone 31, is captured in the voice AI assistant service terminal 3, and data recognized by the voice recognition module 32 is provided to the voice AI assistant service program execution environment 35. The voice AI assistant service program execution environment 35 requests the voice AI assistant service program server 14 to provide a corresponding voice assistant service program on the basis of the voice assistant service back-end control information included in the service request.

The voice AI assistant service program server 14 returns the corresponding voice assistant service program to the voice AI assistant service terminal 3 in response to the received request (Step S724). The voice AI assistant service terminal 3 sets up the voice assistant service program distributed by the voice AI assistant service program server 14 in the voice AI assistant service program execution environment 35 and causes the voice AI assistant service program execution environment 35 to execution that voice assistant service program.

This can achieve provision of information by an appropriate voice assistant service for an additional image appearing in a scene during the time shift reproduction.

(Automatic Switching of Voice Assistant Service Program)

In the above-mentioned time shift reproduction using bookmarks, the function name described in the voice assistant service back-end control information of the POI metadata is incorporated in the service request from the user U through voice, and thus a voice AI assistant service program that achieves a voice assistant service for an additional image appearing in a scene subjected to the time shift reproduction is set up in the voice AI assistant service terminal 3. However, depending on the moving image content, a voice AI assistant service program to be set up in the voice AI assistant service terminal 3 is changed in each time zone. In this case, the user U has to change the function name incorporated in the service request in each time zone, which increases the load on the user U.

In this regard, a ContextID attribute is introduced in a POIBackEndControl element of the POI metadata, and a URI for requesting the voice AI assistant service program server 14 to provide a voice AI assistant service program different in each time zone under the function name described in the POIBackEndControl element is stored as a value of the ContextID attribute.

In the information processing apparatus 4, for example, the bookmark browser 51 issues an HTTP request to the URI, which is indicated by a value of the ContextID attribute of the POIBackEndControl element described in the POI metadata linked with the bookmark selected by the user U from the bookmark list. The issuance of the HTTP request may be performed, for example, after the user U selects an optional bookmark from the bookmark list or before the user U provides a service request through utterance to the voice AI assistant service terminal 3.

When receiving the HTTP request to the URI indicated by the value of the ContextID attribute, the voice AI assistant service program server 14 distributes a voice AI assistant service program of a corresponding time zone to the voice AI assistant service terminal 3 and causes the voice AI assistant service terminal 3 to set up the voice AI assistant service program.

Thus, even if the voice AI assistant service program is switched according to the time zone, it is unnecessary to change a function name to be incorporated in a service request through utterance, which improves operability for the user U.

FIG. 28 is a diagram showing a change in value of the ContextID attribute in the POI metadata, which is linked with scenes of two time zones to which different voice AI assistant service programs are assigned.

FIG. 28 shows a case where different voice AI assistant service programs are used for a first interval identified by a context switch Context-1 of the function A and a second interval similarly identified by a context switch Context-2 of the function A. A URI including the context switch Context-1 serving as a value of the ContextID attribute of the POIBackEndControl element is stored in the POI metadata of the first interval, and a URI including the context switch Context-2 serving as a value of the ContextID attribute of the POIBackEndControl element is stored in the POI metadata of the second interval.

Thus, the user U utters a service request incorporating the same function name, "function A", in both of the first interval and the second interval, and can thus receive voice assistant services corresponding to the respective intervals.

(Share Restriction for POI Metadata)

The POI metadata can be uploaded to a community service such as a social networking service (SNS) and shared by other users. In this case, for example, in order to prohibit sharing of a voice assistant service that provides premium information, it is favorable to describe sharing propriety control information in the POI metadata. Such sharing propriety control information can be described by the ODRL or the like as the POI use restriction information of the POI metadata.

FIG. 29 is a diagram showing a description example of the sharing propriety control information by the ODRL.

The sharing propriety control information indicates that "the POI metadata can be shared by SNS members."

(Presentation of Bookmarks)

The presentation of the bookmarks of the POI metadata includes the following two methods, for example. The first one is a method using a bookmark list of the POI metadata, and the second one is a method of creating a scene capture database in association with the POI metadata and presenting a scene capture.

Figure 30:
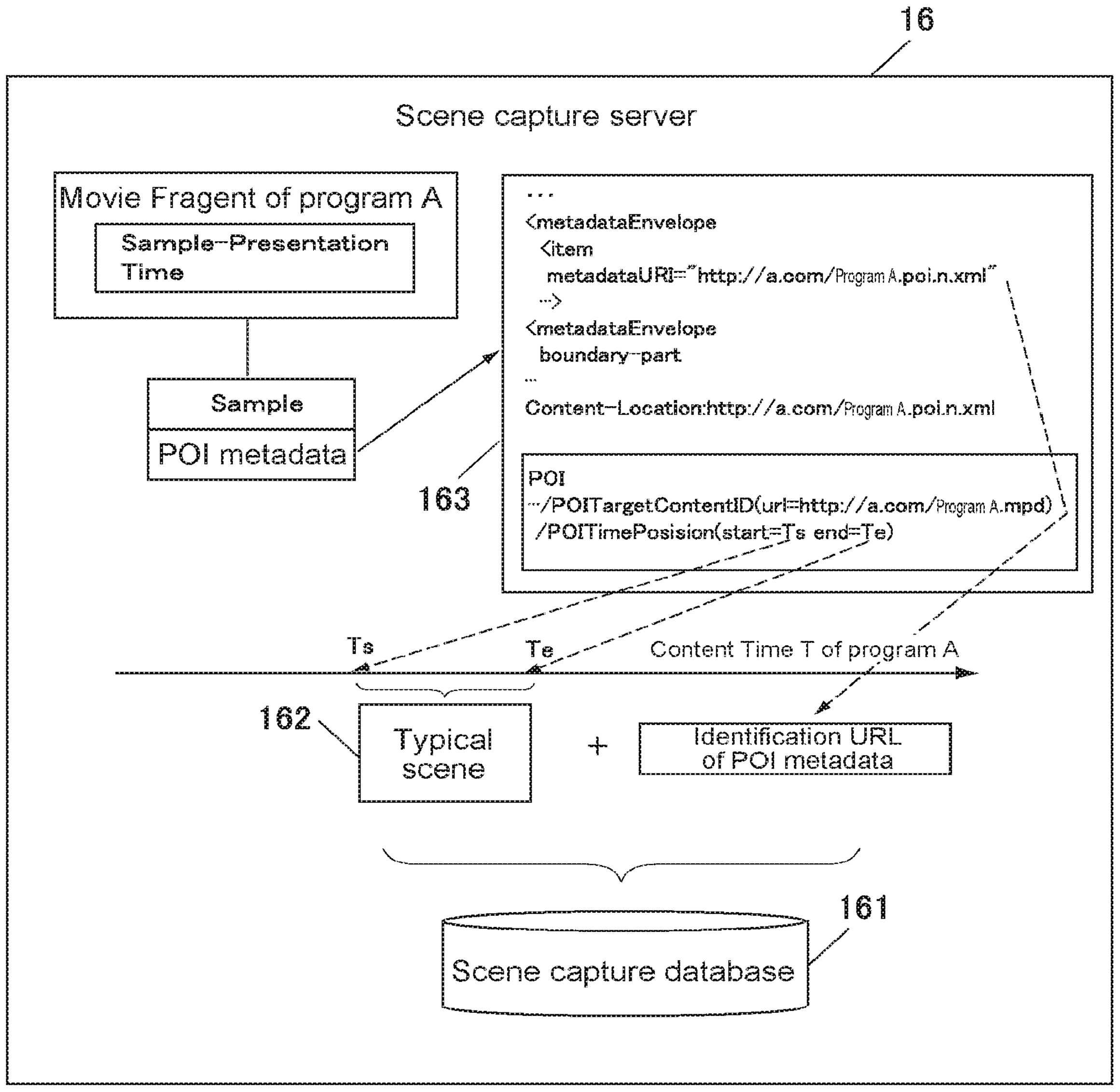
FIG. 30 is a diagram showing a method of creating a scene capture.

FIG. 30 is a diagram showing a method of creating a scene capture.

The scene capture server 16 links an identification URL of POI metadata 163, which corresponds to a typical scene specified in advance in the moving image content, with a typical scene for bookmark presentation, an image 162, which is created from stream data in a presentation time (start time, end time) of an additional image described in the POI metadata 163, and then registers them in a scene capture database 161 as scene capture data. The bookmark browser 51 of the information processing apparatus 4 requests the scene capture server 16 to provide the image of the typical scene on the basis of the identification URL of the POI metadata registered as a bookmark by the user U and displays the returned image of the typical scene.

Note that the present technology is not limited to the embodiment described above and can be variously modified without departing from the gist of the present invention as a matter of course.

The present technology can have the following configurations.

(1) An information processing apparatus, including:

a media reproduction unit that acquires and reproduces video data including a service object, for which a service that processes a request from a user through voice is available; and a controller that adds an additional image for informing the user about the service object to the reproduced video and saves identification information of the video data and information of a start time and an end time of the additional image, as a bookmark that is optionally selected by the user and is provided to a scene with the additional image.

(2) The information processing apparatus according to (1), in which the controller receives a selection of the optional bookmark from the user and reproduces the video data with the additional image on the basis of the identification information of the video data and the information of the start time and the end time of the additional image, which correspond to the selected bookmark.

(3) The information processing apparatus according to any one of (1) and (2), in which the controller acquires metadata including the identification information of the video data and the information of the start time and the end time of the additional image to generate the additional information, and adds the additional information on the basis of the acquired metadata.

(4) The information processing apparatus according to (3), in which the metadata includes service back-end control information including a function name that indicates a function of the service identified by utterance from the user, and the controller presents the function name of the service back-end control information to the user, the service back-end control information being included in the metadata corresponding to the bookmark selected by the user.

(5) The information processing apparatus according to (4), in which the metadata includes information for requesting a different function for each time zone by using one function name, and the controller transmits the request to a server that switches the function of the service on the basis of the information.

(6) The information processing apparatus according to any one of (1) and (5), in which the controller restricts use of the service for each service object.

(7) The information processing apparatus according to (6), in which the restriction is a restriction by charging.

(8) The information processing apparatus according to (7), in which the restriction is a restriction regarding whether sharing of the metadata of the additional image on a community service is possible or not.

(9) The information processing apparatus according to any one of (1) and (8), in which the additional image includes a visual feature unique to each service object such that the service object is uniquely determined by voice recognition in the service.

(10) The information processing apparatus according to any one of (1) and (9), in which the additional image is presented at a position attached to the service object.

(11) The information processing apparatus according to any one of (3) and (10), in which the controller acquires an MPD file including AdaptationSet of the metadata, analyzes the MPD file, acquires each of the video data and the metadata as a Media Segment of MPEG-DASH, and presents the video data and the additional image based on the metadata in synchronization with each other.

REFERENCE SIGNS LIST

4 information processing apparatus
11 moving image content server
12 application server
13 POI metadata server
41 AV decoder
42 POI metadata processing module
43 application execution environment
44 renderer
45 display
46 speaker
47 user determination module

The invention claimed is:

1. An information processing apparatus, comprising:

processing circuitry configured to:

acquire video data and reproduce the video data to present a reproduced video including a service object, for which a service that processes a request from a user through voice is available;

acquire metadata that includes identification information of the video data;

add an additional image for informing the user about the service object to the reproduced video according to the metadata; and in response to a user instruction, save the identification information of the video data and time information of a start time and an end time of the additional image, as a bookmark that is selectable by the user for reproduction of a scene of the reproduced video with the additional image.

2. The information processing apparatus according to claim 1, wherein the processing circuitry is configured to:

receive a selection of the bookmark from the user; and in response to the selection, reproduce the video data to present the scene of the reproduced video with the additional image on a basis of the identification information of the video data and the time information of the start time and the end time of the additional image, which correspond to the bookmark.

3. The information processing apparatus according to claim 2, wherein the processing circuitry is configured to:

acquire the metadata including the identification information of the video data and the timing information of the start time and the end time of the additional image; and generate the additional image and add the additional image on a basis of the acquired metadata.

4. The information processing apparatus according to claim 3, wherein the metadata includes service back-end control information including a function name that indicates a function of the service identified by utterance from the user, and the processing circuitry is configured to present the function name of the service back-end control information, the service back-end control information being included in the metadata corresponding to the bookmark selected by the user.

5. The information processing apparatus according to claim 4, wherein the metadata includes information for requesting a different function for each time zone by using one function name, and the processing circuitry is configured to transmit the request to a server that switches the function of the service on a basis of the information.

6. The information processing apparatus according to claim 3, wherein the processing circuitry is configured to:

acquire an MPD (Media Presentation Description) file including AdaptationSet of the metadata;

analyze the MPD file;

acquire each of the video data and the metadata as a Media Segment of MPEG-DASH (Dynamic Adaptive Streaming over HTTP); and present the reproduced video and the additional image based on the metadata in synchronization with each other.

7. The information processing apparatus according to claim 1, wherein the processing circuitry is configured to impose a restriction restricting use of the service for each service object.

8. The information processing apparatus according to claim 7, wherein the restriction is a restriction by charging.

9. The information processing apparatus according to claim 7, wherein the restriction is a restriction regarding whether sharing of the metadata of the additional image on a community service is possible or not.

10. The information processing apparatus according to claim 1, wherein the additional image includes a visual feature unique to each service object such that the service object is uniquely determined by voice recognition in the service.

11. The information processing apparatus according to claim 1, wherein the additional image is presented at a position attached to the service object.

12. The information processing apparatus according to claim 1, wherein the metadata further includes filtering information indicating whether adding the additional image for the service object to the reproduced video is restricted.

13. An information processing method, comprising:

acquiring video data and reproducing the video data to present a reproduced video including a service object, for which a service that processes a request from a user through voice is available;

acquiring metadata that includes identification information of the video data;

adding, by processing circuitry of an information processing apparatus, an additional image for informing the user about the service object to the reproduced video according to the metadata; and in response to a user instruction, saving, by the processing circuitry of the information processing apparatus, the identification information of the video data and time information of a start time and an end time of the additional image, as a bookmark that is selectable by the user for reproduction of a scene of the reproduced video with the additional image.

14. The information processing method according to claim 13, wherein the metadata further includes filtering information indicating whether adding the additional image for the service object to the reproduced video is restricted.

15. A non-transitory computer-readable storage medium storing a computer program, which when being executed by a computer causes the computer to perform a method comprising:

acquiring video data and reproducing the video data to present a reproduced video including a service object, for which a service that processes a request from a user through voice is available;

acquiring metadata that includes identification information of the video data;

adding an additional image for informing the user about the service object to the reproduced video according to the metadata; and in response to a user instruction, saving the identification information of the video data and time information of a start time and an end time of the additional image, as a bookmark that is selectable by the user for reproduction of a scene of the reproduced video with the additional image.

16. The non-transitory computer-readable storage medium according to claim 15, wherein the metadata further includes filtering information indicating whether adding the additional image for the service object to the reproduced video is restricted.

* * * * *